United States Patent
Chow et al.

(10) Patent No.: US 11,838,576 B2
(45) Date of Patent: Dec. 5, 2023

(54) VIDEO DISTRIBUTION SYSTEM, METHOD, COMPUTING DEVICE AND USER EQUIPMENT

(71) Applicant: LEMON INC., Grand Cayman (KY)

(72) Inventors: Ryan Chow, Culver City, CA (US); Jacqueline Craig, Culver City, CA (US); Billy Torres, Culver City, CA (US); Peter Schoeffman, Culver City, CA (US); Yizhuo Wang, Los Angeles, CA (US); Jing Xu, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 62 days.

(21) Appl. No.: 17/609,345

(22) PCT Filed: Aug. 17, 2021

(86) PCT No.: PCT/SG2021/050477
§ 371 (c)(1),
(2) Date: Nov. 5, 2021

(87) PCT Pub. No.: WO2022/081081
PCT Pub. Date: Apr. 21, 2022

(65) Prior Publication Data
US 2022/0353565 A1    Nov. 3, 2022

(30) Foreign Application Priority Data
Oct. 15, 2020    (CN) .......................... 202011105458.5

(51) Int. Cl.
*H04N 21/43* (2011.01)
*H04N 21/431* (2011.01)
(Continued)

(52) U.S. Cl.
CPC .... *H04N 21/4316* (2013.01); *H04N 21/23418* (2013.01); *H04N 21/2668* (2013.01)

(58) Field of Classification Search
None
See application file for complete search history.

(56) References Cited

U.S. PATENT DOCUMENTS

| 2014/0033037 | A1 | 1/2014 | Xu et al. | |
| 2014/0163980 | A1* | 6/2014 | Tesch | G10L 25/57 |
| | | | | 704/235 |

(Continued)

FOREIGN PATENT DOCUMENTS

| CN | 103164405 | 6/2013 |
| CN | 103970894 A | 8/2014 |

(Continued)

OTHER PUBLICATIONS

Zhang, W., "Web Video Thumbnail Recommendation by Visual Content Analysis," Intelligent Computer and Application, vol. 4, No. 3, Jun. 2015, pp. 1-6.

(Continued)

*Primary Examiner* — Cai Y Chen
(74) *Attorney, Agent, or Firm* — Faegre Drinker Biddle & Reath LLP

(57) ABSTRACT

A video distribution system, method, and a storage medium, the system including: at least one database storing a plurality of videos; a computing device communicatively connected with the at least one database and configured to: classify the plurality of videos into a plurality of categories based on attributes associated with the plurality of videos; determine a plurality of cover images; send the plurality of cover images to a user equipment, so that the plurality of cover images are at least partially superimposedly displayed on a first video being played; select a first image from the plurality of cover images in response to a first user input;

(Continued)

automatically select a second video from a first category corresponding to the first image; acquire the second video from the at least one database; and send at least a part of the second video to the user equipment to play the second video.

18 Claims, 15 Drawing Sheets

(51) Int. Cl.
  *H04N 21/234* (2011.01)
  *H04N 21/2668* (2011.01)

(56) References Cited

U.S. PATENT DOCUMENTS

| | | |
|---|---|---|
| 2018/0046337 A1* | 2/2018 | Fukuda ................ G11B 27/102 |
| 2020/0234034 A1 | 7/2020 | Savchenkov et al. |

FOREIGN PATENT DOCUMENTS

| | | |
|---|---|---|
| CN | 108881979 | 11/2018 |
| CN | 110163050 | 8/2019 |
| CN | 110351597 A | 10/2019 |
| CN | 111079016 | 4/2020 |
| CN | 111160254 | 5/2020 |
| CN | 111339355 | 6/2020 |
| CN | 111343490 A | 6/2020 |
| JP | 2020-042413 A | 3/2020 |

OTHER PUBLICATIONS

International Patent Application No. PCT/SG2021/050477, International Search Report and Written Opinion dated Nov. 30, 2021, 19 pages with English Translation.

* cited by examiner

VIDEO DISTRIBUTION SYSTEM, METHOD, COMPUTING DEVICE AND USER EQUIPMENT

CROSS REFERENCE TO RELATED APPLICATIONS

This application is a U.S. National Stage Application filed under 35 U.S.C. § 371 claiming priority to Application of International Patent Application No. PCT/SG2021/050477, filed on 17 Aug. 2021, which application claims priority to Chinese Patent Application No. 202011105458.5 filed on Oct. 15, 2020, which are incorporated herein by reference in their entireties as a part of this application.

TECHNICAL FIELD

Embodiments of the present disclosure relates to a video distribution system, method, computing device and a user equipment.

BACKGROUND

With various software or platforms based on the Internet, more and more videos may be distributed to users for viewing. As a result, video distribution has become more popular, and users begin to expect to be able to access and watch videos on various platforms and devices. In order to meet the expectations of users, it is expected to provide convenience for users to access and watch videos on various platforms and devices.

SUMMARY OF THE DISCLOSURE

Embodiments of the present disclosure provide a video distribution system, method, computing device and a user equipment.

In a first aspect, a video distribution system is provided, the system comprising: at least one database storing a plurality of videos; and a computing device communicatively connected with the at least one database and configured to:
  classify the plurality of videos into a plurality of categories based on attributes associated with the plurality of videos;
  determine a plurality of cover images, the plurality of cover images respectively corresponding to the plurality of categories;
  send the plurality of cover images to a user equipment, so that the plurality of cover images are at least partially superimposedly displayed on a first video being played;
  select a first image from the plurality of cover images in response to a first user input;
  automatically select a second video from a first category corresponding to the first image;
  acquire the second video from the at least one database; and
  send at least a part of the second video to the user equipment to play the second video, wherein the plurality of cover images are at least partially superimposedly displayed on the second video being played.

In a second aspect, a video distribution method is provide, the method comprising:
  classifying the plurality of videos into a plurality of categories based on attributes associated with the plurality of videos;
  determining a plurality of cover images, the plurality of cover images respectively corresponding to the plurality of categories;
  sending the plurality of cover images to a user equipment, so that the plurality of cover images are at least partially superimposedly displayed on a first video being played;
  selecting a first image from the plurality of cover images in response to a first user input;
  automatically selecting a second video from a first category corresponding to the first image;
  acquiring the second video; and
  sending at least a part of the second video to the user equipment to play the second video, wherein the plurality of cover images are at least partially superimposedly displayed on the second video being played.

In a third aspect, a non-transitory computer-readable storage medium on which a computer program is stored is provided, and when the computer program is executed by a processor, the method of any one of the above second aspect is implemented.

In a fourth aspect, a computing device is provided, comprising:
  a memory on which a computer program is stored;
  a processor configured to execute the computer program stored in the memory, to implement the method of any one of above second aspect.

In a fifth aspect, a user equipment is provided, comprising:
  at least one processor; and
  a memory communicatively connected to the at least one processor and storing a computer program, which when executed by the at least one processor causes the user equipment to:
  receive a plurality of cover images respectively corresponding to a plurality of categories, each of the plurality of categories including a plurality of videos;
  at least partially superimposedly display the plurality of cover images on a first video being played;
  select a first image from the plurality of cover images in response to a first user input;
  play a second video automatically selected from a first category corresponding to the first image; and
  at least partially superimposedly display the plurality of cover images on the second video being played.

In a sixth aspect, a video playing method performed by a user equipment is provided, the method comprising:
  receiving a plurality of cover images respectively corresponding to a plurality of categories, each of the plurality of categories including a plurality of videos;
  at least partially superimposedly displaying the plurality of cover images on a first video being played;
  selecting a first image from the plurality of cover images in response to a first user input;
  playing a second video automatically selected from a first category corresponding to the first image; and
  at least partially superimposedly displaying the plurality of cover images on the second video being played.

In the video distribution system, method, computing device and the user equipment provided by the embodiments of the present disclosure, with the at least one database storing a plurality of videos and the computing device communicatively connected with the at least one database, by firstly classifying the plurality of videos into a plurality of categories based on attributes associated with the plurality of videos; determining a plurality of cover images respectively corresponding to the plurality of categories; sending the plurality of cover images to a user equipment, so that the plurality of cover images are at least partially superimposedly displayed on a first video being played; then responding to a first user input indicating to select a first image from the plurality of cover images; automatically selecting a second video from a first category corresponding to the first image; acquiring the second video from the at least one database; and sending at least a part of the second video to the user equipment to play the second video, wherein the plurality of cover images are at least partially superimposedly displayed on the second video being played, users are provided with the convenience of watching a plurality of target videos and a plurality of pictures in a same user interface, and selecting a desired video from different categories corresponding to the plurality of pictures while watching a target video, thereby enabling convenient ways and operations for the users to access and watch videos on various video platforms and devices, meeting requirements of the users, and providing the users with better viewing experience.

BRIEF DESCRIPTION OF THE DRAWINGS

The following detailed description may be better understood with reference to accompanying drawings. For illustrative purposes, example embodiments of various aspects of the present disclosure are shown in the drawings; however, the present disclosure is not limited to the specific methods and means disclosed.

DESCRIPTION OF THE EMBODIMENTS

Figure 1:
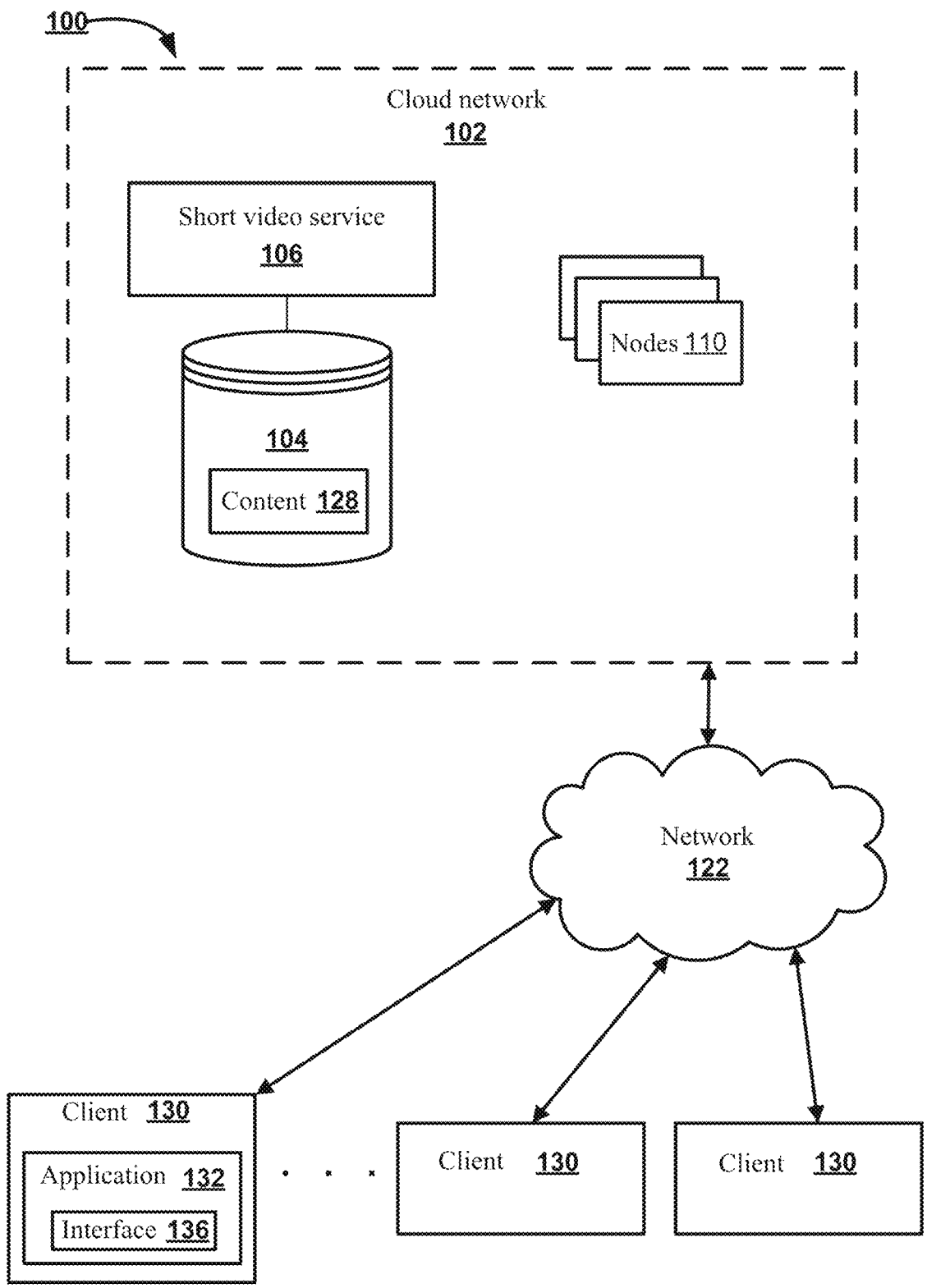
FIG. 1 shows a video distribution system according to an embodiment of the present disclosure.

FIG. 1 shows an exemplary diagram of a video distribution system according to an embodiment of the present disclosure. The system 100 may include a cloud network 102 (including a cloud server) and a plurality of client devices 130. The cloud network 102 and the plurality of client devices 130 may communicate via one or more networks 122.

The cloud network 102 may be located in a data center (such as a single location) that is a specific device network for global collaboration or distributed in different geographic locations (for example, located in multiple locations). The cloud network 102 may provide services via the one or more networks 122. The network 122 includes various network devices, such as routers, switches, multiplexers, hubs, modems, bridges, repeaters, firewalls, proxy devices, and so on. The network 122 may include physical links (such as coaxial cable links, twisted pair cable links, optical fiber links, and combinations thereof), and may also include wireless links such as cellular links, satellite links, Wi-Fi links and the like.

The cloud network 102 may include a plurality of computing nodes 110 that host various services. In an embodiment, a node 110 may host a short video service 106. The short video service 106 may include a content streaming service such as an Internet protocol video streaming service. The short video service 106 may be configured to distribute content 128 (e.g., short videos) through various transmission technologies. The short video service 106 is configured to provide the content 128, such as videos, audios, text data, and/or combinations thereof. The content 128 may include a content stream (e.g., at least one of a video stream, an audio stream, and an information stream), a content file (e.g., at least one of a video file, an audio file, and a text file), and/or other data. The content 128 may be stored in a database 104. For example, the short video service 106 may include a video sharing service, a video hosting platform, a content distribution platform, a collaborative gaming platform, and so on.

In an embodiment, the system 100 includes at least one database 104 in which a plurality of videos are stored, and the plurality of videos include at least short videos. The content 128 provided by the short video service 106 includes short videos. Duration of the short videos may be less than or equal to a predetermined length of time, such as 15 seconds, 1 minute, 5 minutes, or other predetermined length of time. As an example, a short video may include a combination of at least one 15-second video segment, which is not specifically limited. Due to the short duration of short videos, users can browse a large number of videos in a short period of time. Therefore, short videos are becoming more and more popular on platforms such as social media.

Short videos may include pre-recorded audio overlays, such as pre-recorded TV shows or movie songs or audio segments. If a short video includes pre-recorded audio overlays, one or more users may lip-sync or dance based on the pre-recorded audio. For example, a single user may complete a "dance challenge" to a popular song based on pre-recorded audio, or two users may participate in a duo lip-sync or dance, and so on. In an embodiment, some short videos may not include pre-recorded audio overlays. Short videos may include sports, comedies, or provide advices on, for example, beauty and fashion, cooking skills or home decoration skills, and so on.

In an embodiment, the content 128 may be transmitted to different client devices 130 via the network 122. The content 128 may include a content stream. The content stream may include a short video stream received from the short video service 106. The plurality of client devices 130 may access the content 128 from the short video service 106. In an embodiment, the client device 130 may include a content application 132. The content application 132 may output the content 128 to users by way of display, rendering, presentation and the like. The content may include videos, audios, comments and/or text data, etc.

The plurality of client devices 130 may include any type of electronic devices, such as mobile devices, tablet devices, laptops, desktop computers, smart TVs or other smart devices (e.g., smart watches, smart speakers, smart glasses, smart helmets), gaming devices, set-top boxes, digital streaming devices, and/or robots, and the like. The plurality of client devices 130 may be associated with one or more users. A user may access the cloud network 102 by using the client device 130. Different client devices 130 may be placed in different locations and use different networks to access the cloud network 102.

The short video service 106 may be configured to receive user inputs. A user may be registered as a user of the short video service 106, and may be a user of the content application 132 installed on the client device 130. A user input may include a short video created by the user, a user comment associated with the short video, or operations such as a like associated with the short video. The short video service 106 may receive different types of inputs from a plurality of users using different client devices 130. For example, a user using the content application 132 of the client device may use the content application 132 to create and upload short videos. The user who uses the content application 132 on the client device may also browse, comment, or like short videos uploaded by other users or comments made by other users. In another example, the user may also use the content application 132 on a smart TV, a laptop, a desktop computer, or a gaming device to browse short videos, comments from other users, and like short videos, etc.

In an embodiment, the user may use the content application 132 on the client device 130 to create a short video and upload the short video to the cloud network 102. The client device 130 may access an interface 136 of the content application 132. The interface 136 may include an input element. For example, the input element may be configured to allow the user to create short videos. In order to create a short video, the user may grant, via the client device, the content application 132 a permission to access the camera or microphone of the client device 130. By using the content application 132, the user may select a duration of the short video or set a speed for the short video, such as "slow motion" or "speed up".

The user may use the content application 132 to edit the short video. The user may add one or more texts, filters, sounds or special effects to the short video. In order to add a pre-recorded audio overlay to the short video, the user may select a song or sound segment from a sound library of the content application 132. The sound library may include different songs, sound effects, or audio segments from movies, albums, and TV shows. In addition to adding pre-recorded audio overlays to the short video, the user may also use the content application 132 to add a voice-over to the short video. The voice-over may include voices recorded by the user by using the microphone of the client device 130. The user may also add a text to the short video and superimpose it on the client device 130, and may also specify the time when the user wants the text superimposed to appear in the short video by using the content application 132. In addition, the user may also set a title, a location tag, and one or more hashtags for the short video to indicate topics of the short video. The content application 132 may also prompt the user to select any frame in the short video to be used as a "cover image" of the short video.

After the user creates the short video, the user may upload the short video to the cloud network 102 and/or save the short video locally to the client device 130. When the user uploads the short video to the cloud network 102, the user may further choose whether or not he/she wants the short video to be visible to all other users of the content application 132. The short video service 106 may store the short video uploaded by the user and any metadata associated with the short video in one or more databases 104.

In an embodiment, the user may use the content application 132 to provide inputs regarding the short video. The client device 130 may access the interface 136 of the content application 132, which allows the user to provide inputs associated with the short video. The interface 136 may include an input element. For example, the input element may be configured to receive an input of the user, and the input may include, for example, a comment or a like operation associated with the short video (e.g., "like" means love). If the user's input includes a comment, the content application 132 may allow the user to set emojis associated with the input. The content application 132 may determine time information of the input, such as a time when the user inputs the comment. The content application 132 may send the input and associated metadata to the cloud network 102. For example, the content application 132 may send the comment, an identifier of the user who inputs the comment, and the time information of the comment to the cloud network 102. The short video service 106 may store the input and the associated metadata in the database 104.

The short video service 106 may be configured to output short videos and associated user inputs to other users. A user may register as a user of the short video service 106 to browse short videos created and uploaded by other users. Users may include users of the content application 132 running on the client device 130. The content application 132 may output a short video and associated user comments to users by way of display, rendering, presentation, and the like. The client device 130 may access the interface 136 of the content application 132. The interface 136 may include an output element. The output element may be configured to display information of different short videos, so that a user may select a short video to be browsed. For example, the output element may be configured to display a cover image, a title, and/or a hashtag associated with each short video. The output element may also arrange and display a category of each short video on the user interface according to the category associated with each short video.

In an embodiment, user comments associated with a certain short video may be output to other users browsing the short video. For example, all users who visit the short video may browse the comments associated with the short video. The short video service 106 may simultaneously output the short video and its associated comments. The short video service 106 may output these comments in real time or near real time. The content application 132 may display the short video and the associated comments on the client device 130 in various ways. For example, the content application 132 may display the comments associated with the short video in an overlay layer above or below a content (e.g., the short video) or an overlay layer next to the content. In addition, the content application 132 may also dynamically display these comments, for example, the content application 132 may scrollingly display these comments on the short video or the overlay layer.

The plurality of computing nodes 110 may handle tasks associated with the short video service 106. The plurality of computing nodes 110 may be implemented as one or more computing devices, one or more processors, one or more virtual computing instances, and/or combinations thereof. The plurality of computing nodes 110 may be implemented by one or more computing devices. The one or more computing devices may include virtualized computing instances. The virtualized computing instances may include virtual machines, such as simulations of computer systems, operating systems, and/or servers, etc. A virtual machine may be loaded by a computing device based on virtual images and/or other data used to define specific simulation software (e.g., an operating system, a dedicated application, a server). As the demand for different types of processing services changes, different virtual machines may be loaded and/or terminated on one or more computing devices. A hypervisor may be implemented to manage use of different virtual machines on a same computing device.

Figure 2A:
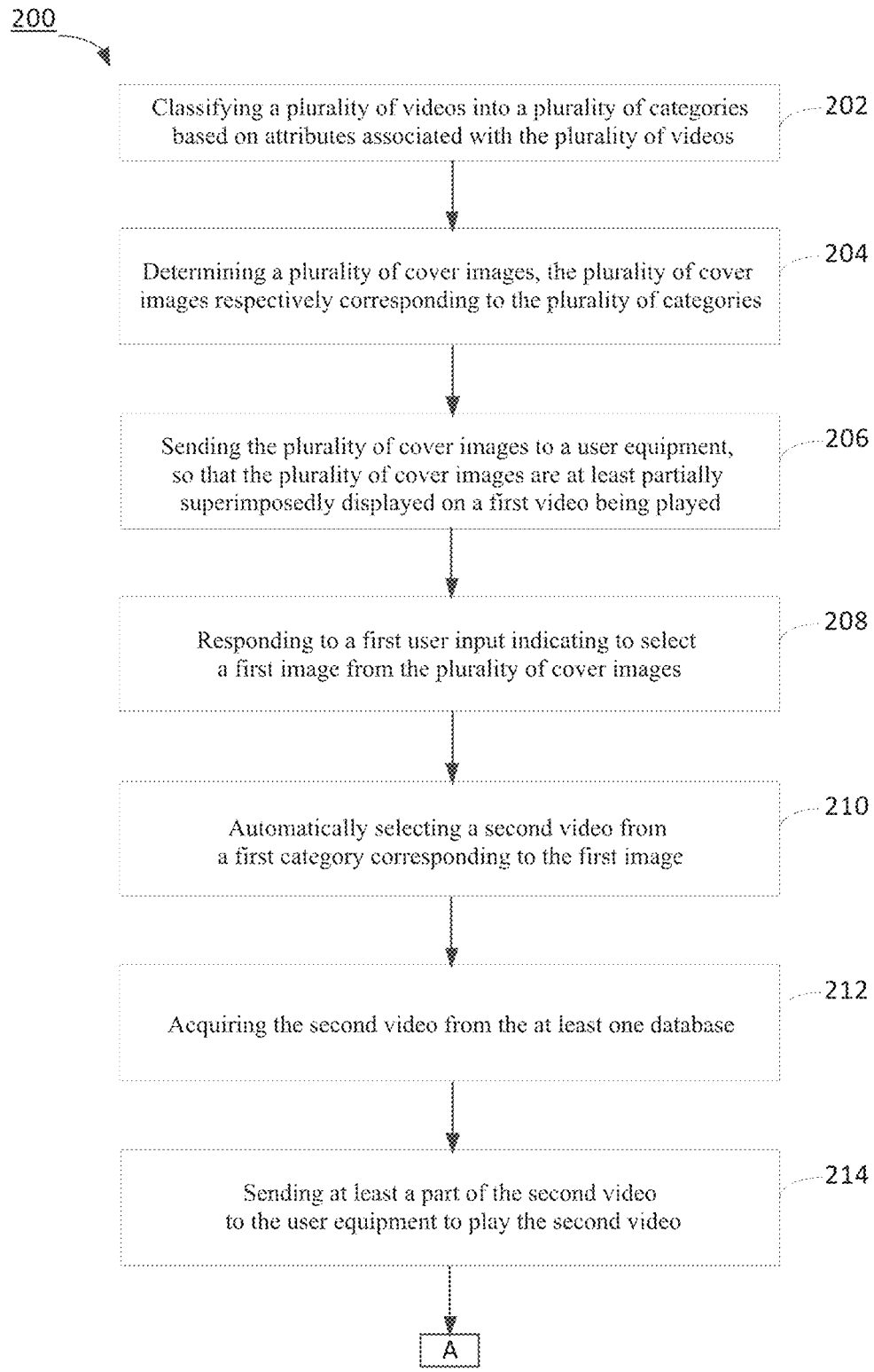
FIGS. 2A-2B show an example process of video distribution that may be performed by a cloud network according to an embodiment of the present disclosure.
Figure 2B:
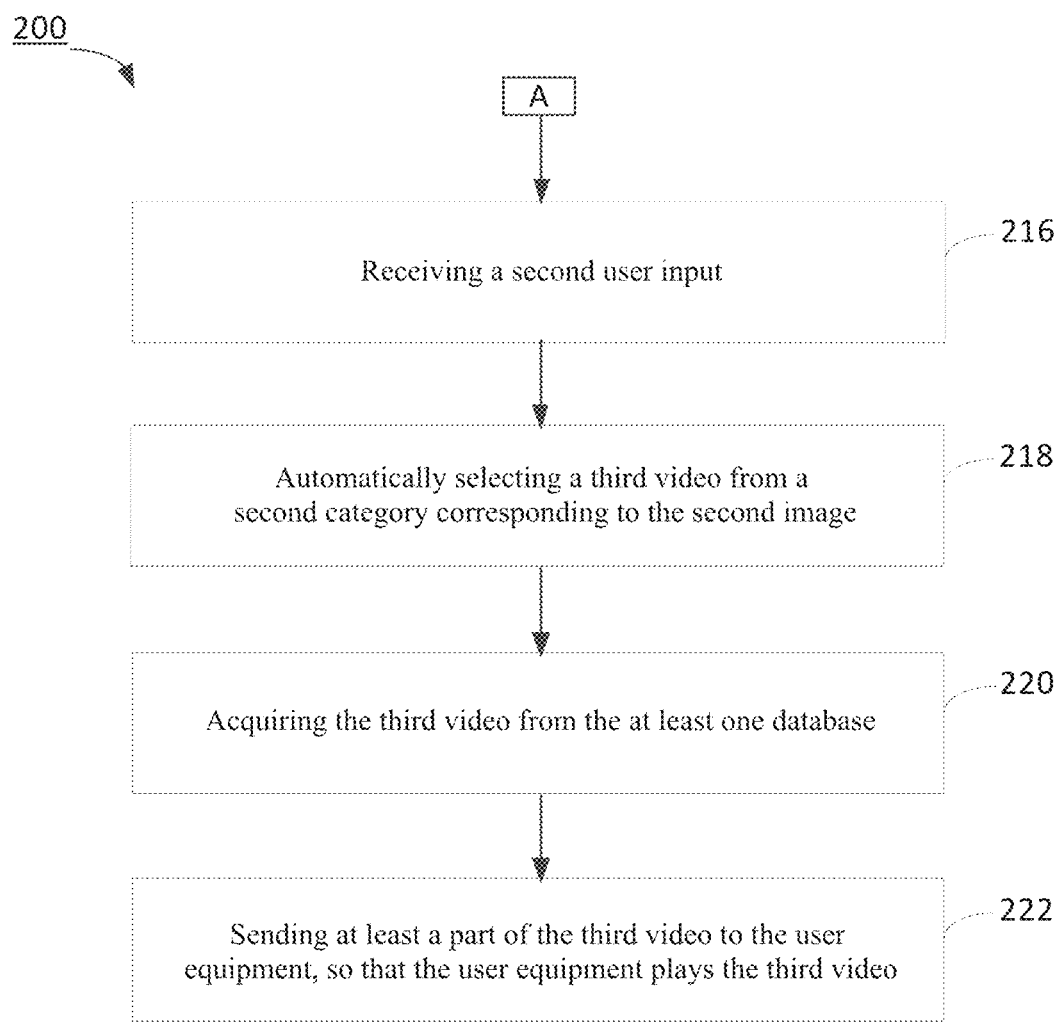

FIGS. 2A and 2B show an example process 200 performed by a cloud network (e.g., the cloud network 102). The cloud network 102 may perform the process 200 to distribute content such as short videos to users for the users to play on a user equipment. Although a series of operations are shown in FIG. 2, those of ordinary skill in the art will understand that various embodiments may add, remove, reorder, or modify the operations shown.

Figure 3A:
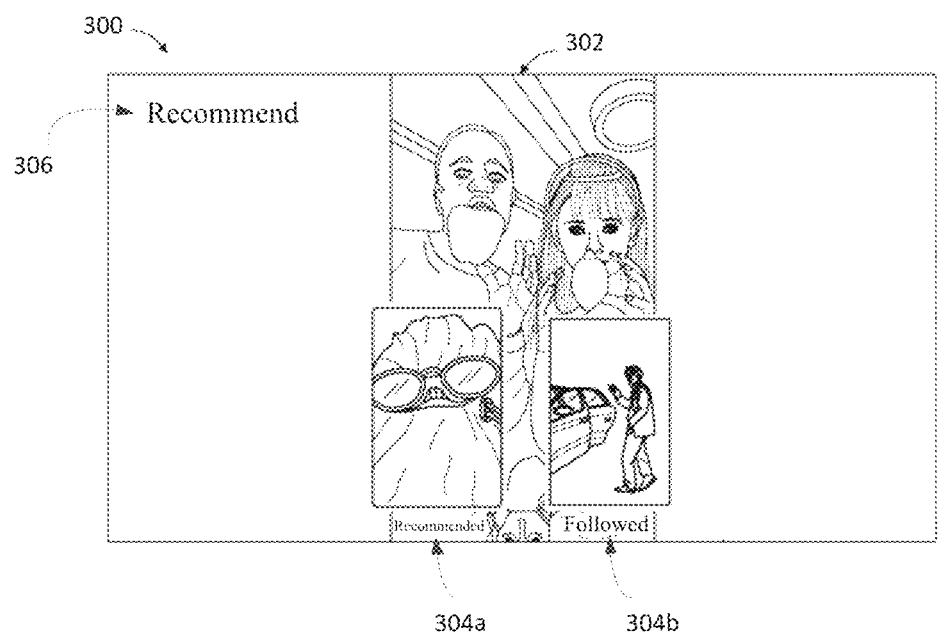
FIGS. 3A-3B show an example user interface of a user equipment according to an embodiment of the present disclosure.

FIGS. 3A-16 depict example user interfaces (UIs) of a user equipment (the user equipment may be the client device 130, e.g., the client device 130) according to an embodiment of the present disclosure. These examples and embodiments are intended to illustrate rather than limit the present disclosure. As shown in FIG. 3A, a user may browse a subset of at least two cover images, such as cover images 304a-b, on UI 300 of the client device 130. Different cover images correspond to different categories. For example, the cover image 304a corresponds to a "Recommended" category; the cover image 304b corresponds to a "Followed" category. For the two categories (Recommended and Followed), classification of short videos is based on an attribute of video authors, such as whether the user follows an author or not.

In an embodiment, the client device 130 may be a smart TV. The user may browse subsets of cover images by clicking buttons on a remote control device of the smart TV (e.g., a "Right" button). For example, a feed indicator 306 on the current UI 300 indicates that a first video currently being played belongs to the "Recommended" category. When the user operates the "Right" button on the remote control device, the user may browse a subset of cover images, that is, the "followed" category. In addition, the user may also hide the subsets of cover images by clicking buttons such as "up" and the like on the remote control device.

The cover images are at least partially superimposedly displayed on a video 302 being played, and the user may browse the first video 302 and the subsets of cover images at the same time. Each cover image may be dynamically played on the UI 300 in, for example, Graphics Interchange Format (GIF). The UI 300 may indicate a category to which the currently played first video 302 belongs by a feed indicator 306. For example, the feed indicator 306 of the UI 300 indicates that the currently played first video belongs to the "Recommended" category. The feed indicator 306 may automatically fade out of the UI 300 after a predetermined period of time, such as three seconds. The user may browse the cover images while the first video is paused or the first video is playing. The client device 130 may also play the first video in a loop in an "auto loop" mode.

Returning to FIG. 2A, in 202, the cloud network 102 may determine attributes associated with the videos 128, and correspond the plurality of videos to at least one of the plurality of categories. The plurality of categories may include (but are not limited to) one or more of the following categories: "Recommended", "Followed", "Learning", "Comedy", "Sports", "Work", "Cooking", "Dance", "Entertainment", "Fitness", "Home Decoration", "Beauty", "Fashion", "Cooking", "Advice", "Pet" and the like.

In an embodiment, attributes associated with a video may include a title of the video, a sound segment of the video, at least one hashtag, the author of the video, and so on. Moreover, the attributes associated with the video may correspond to at least one category. For example, the video may be associated with the hashtag "#dancer". The hashtag "#dancer" may correspond to at least one of the categories "Dance" or "Entertainment". As another example, if the video is associated with a sound segment of a dog barking, the sound segment may correspond to the "Pet" category.

In 202, the cloud network 102 may divide the plurality of videos into a plurality of categories. That is, based on the attributes associated with the plurality of videos, the cloud network 102 may divide the plurality of videos into a plurality of categories. For example, the cloud network 102 may divide the plurality of videos into a plurality of categories according to categories corresponding to the attributes associated with the videos. For example, for a video whose hashtag of the attributes is "#dancer", since this hashtag "#dancer" may correspond to the categories "Dance" and "Entertainment", the cloud network 102 may classify the video associated with the hashtag "#dancer" as the "Dance" category and the "Entertainment" category. As another example, the cloud network 102 may classify a video associated with a sound segment of a dog barking as the "Pet" category.

In 204, the cloud network 102 may determine a plurality of cover images, and the plurality of cover images may correspond to the plurality of categories, respectively. In an embodiment, each of the plurality of cover images may be a frame of a short video, and corresponds to a category to which the short video belongs. If an image a is a frame of a short video classified as a category A, then the image a corresponds to the category A. For each category, the cloud network 102 may determine, based on predetermined characteristics of short videos in the category, one frame of image in a certain short video as the cover image corresponding to the category. By way of example and not limitation, the predetermined characteristics may include popularity of the short videos, length of the videos, whether the videos are hot, attributes of the videos, creators of the videos, and so on. Popularity of a video may be expressed by an average rating, the number of times it has been browsed or the number of times it has been shared. For example, the cloud network 102 may determine a certain frame of image of the most popular short video in a certain category, and use the frame of image as the cover image corresponding to the category.

In 206, the cloud network 102 may send the plurality of cover images to a user equipment (e.g., the client device 130), so that the plurality of cover images are at least partially superimposedly displayed on the first video being played. In a display interface of the user equipment, the content application 132 of the user equipment may display at least a subset of the plurality of cover images. The subset of the plurality of cover images may be at least partially superimposedly displayed on the video currently being played. In an embodiment, the subset of the plurality of cover images may be at least partially superimposedly displayed on the first video, and the first video may be a short video currently being browsed by a user of the user equipment.

Figure 3B:
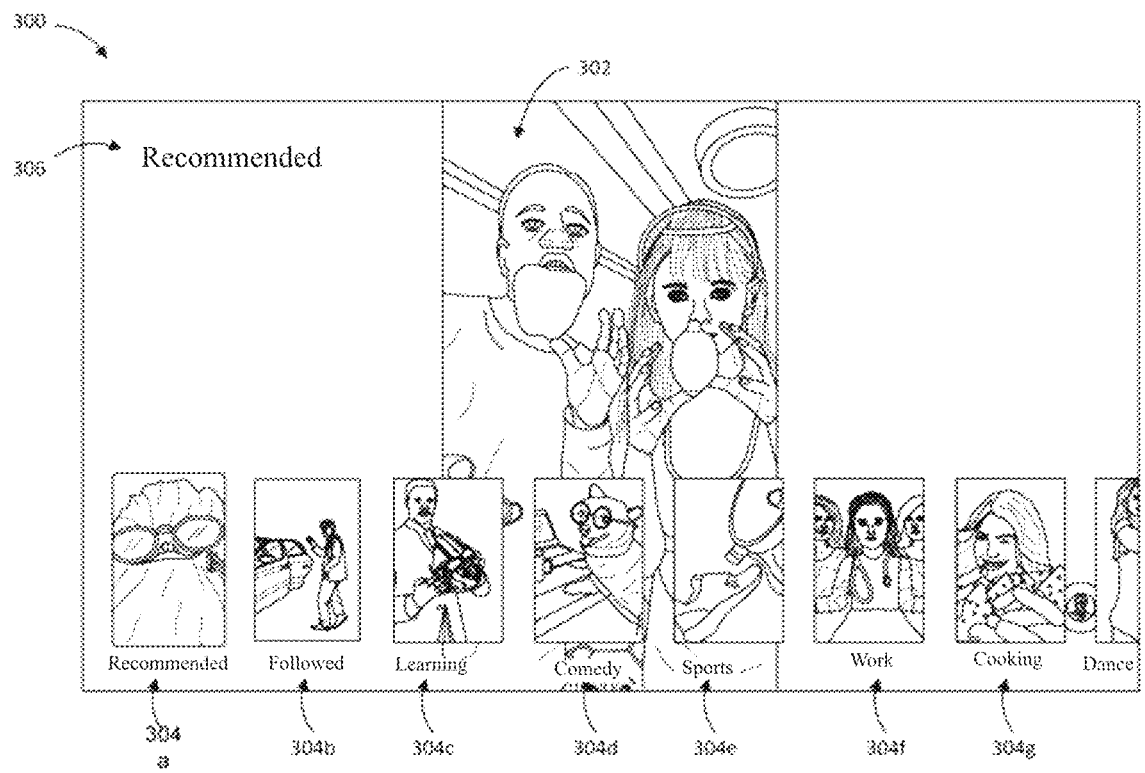

In an embodiment, for example, referring to FIG. 3B, the cover image may further include cover images 304*a-g*, for example. By way of example and not limitation, the subset of the cover images may include cover images 304*a-g* of the plurality of cover images. The user may browse the subset of the cover images by using a remote control device associated with the client device 130. The subset of the cover images may be displayed on the UI 300 in an order indicating categories that the user has recently browsed. The cover images 304*a-g* may be dynamically displayed in the UI 300.

Referring to FIG. 2, at 208, the cloud network 102 may receive a user input indicating to select a first image from the plurality of cover images, and select the first image from the plurality of cover images in response to the user input. The user input may indicate a category the user wants to browse. For example, the user may select a cover image corresponding to a category of a content he wants to browse. The user may select a subset of the cover images while browsing the first video, and confirm whether he/she is interested in videos in the category corresponding to the selected first image. As an example, the user equipment includes a smart TV, and thus, the first user input may be received from a remote control device associated with the smart TV.

The user may use the remote control device associated with the client device 130 (e.g., a smart TV) to browse a subset of the cover images and select an image corresponding to a desired category. In an embodiment, when the user browses and selects a certain cover image on the cover image list using the remote control device, the cover image will appear in the center of the interface of the client device 130. In another embodiment, when the user browses and selects a certain cover image on the cover image list using the remote control, a short video corresponding to the cover image may be displayed in the area where the selected cover image is located. In yet another embodiment, when a selection cursor scrolls past the last cover image of the cover image list, the cursor may automatically loop back to the initial cover image of the cover image list. In connection with FIG. 3B, when the selection cursor reaches the last cover image of the cover image list, the cursor may automatically loop back to the initial cover image of the cover image list, such as the "recommended" image 304*a* of the cover images.

At 210, the cloud network 102 automatically selects a second video from the first category corresponding to the first image. For example, the cloud network 102 may automatically select content such as a short video from the first category corresponding to the first image. The cloud network 102 may automatically select the second video based on predetermined characteristics, such as popularity of the short video, length of the short video, whether the short video is hot, attributes of the video, or a creator of the short video. For example, popularity of a short video may be indicated by an average content rating, the number of times the short video has been browsed, or the number of times the short video has been shared. In an embodiment, the cloud network 102 may automatically select the second video. In an embodiment, the cloud network 102 may automatically select a short video from the first category corresponding to the first image.

At 212, the cloud network 102 may acquire the second video, that is, a short video in the first category corresponding to the first image, from the database 104.

At 214, the cloud network 102 may send at least part of the second video to the user equipment to play the second video in the user equipment. Taking the user equipment including a smart TV as an example, the cloud network 102 may send at least a part of the selected second video to the client device 130 such as a smart TV, so that the second short video may be played by the smart TV, and the user may browse the short video on an interface of the smart TV. For example, if the client device 130 is installed with a content application, such as the content application 132, the second video may be played on the client device 130 by using the content application 132. In an embodiment, the second video may be displayed on the user equipment for its duration. For example, if the selected second video is a short video with a duration of 30 seconds, the second video may be displayed on the user equipment for 30 seconds. Thereafter, if the content application 132 of the client device 130 is set to the "auto loop" mode, the second video may be displayed and played on the interface of the client device 130 again. If the content application 132 is set to the "non-auto loop" mode, the client device 130 may continue to play other videos in the same category as the second video after playing the second video.

In another embodiment, the client device 130 may play the second video until the cloud network 102 receives another user input. The other user input may indicate that the user wants to browse different content in the category where the second video is located. The user may use the remote control device to send the other user input to the cloud network 102, and the client device 130 may play other video content in the category where the second video is located in response to the user input.

Figure 4:
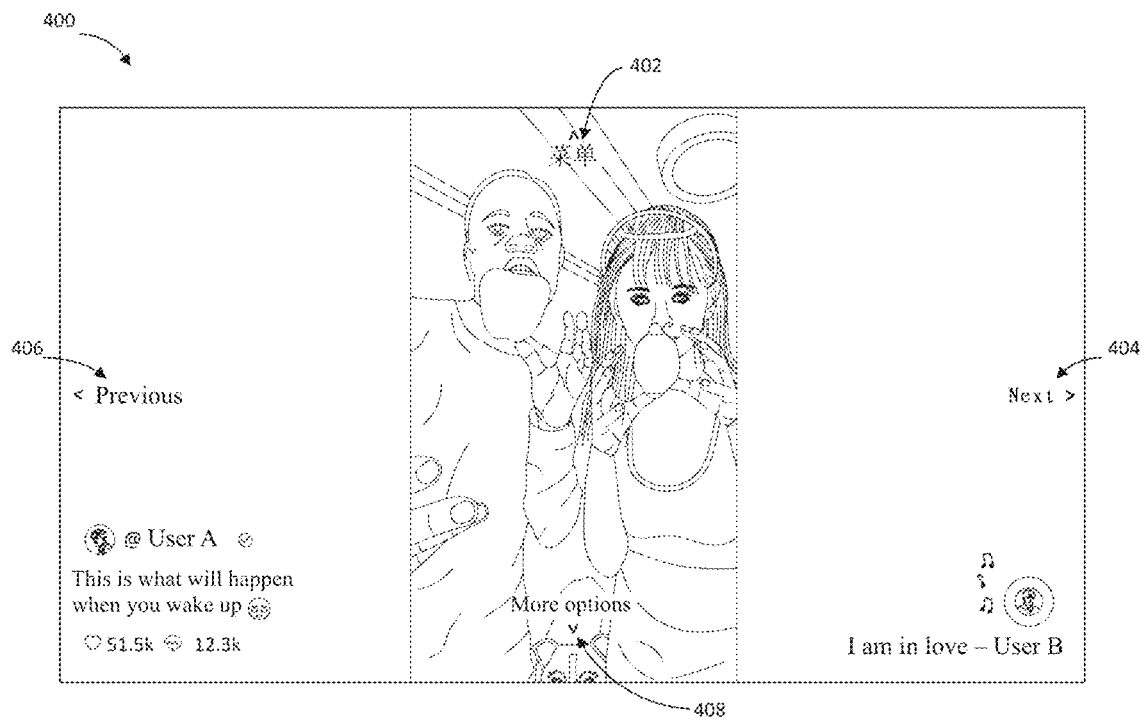
FIG. 4 shows a user interface displayed on a user equipment when an application is launched according to an embodiment of the present disclosure.

In an embodiment, the interface of the user equipment may display prompt information, to prompt the user how to operate the remote control device to browse other video content in the category where the second video being played is located. As shown in FIG. 4, UI 400 of the user equipment may include an overlay layer, which includes a "Next" button prompt 404 corresponding to a "Right" button of the remote control and a "Previous" button prompt 406 corresponding to a "Left" button of the remote control. If the user wants to browse different videos from the same category, the user may select via buttons of the remote control, for example. If the user selects "Previous", the user may browse previously browsed short videos from the same category. If the user selects "Next" 404, the user may browse different short videos from the same category. The user may click the "Right" button on the remote control device to select "Next" 404. The user may click the "Left" button on the remote control device to select "Previous" 406. In an embodiment, the overlay layer may not always be displayed on the UI 400. For example, after a predetermined time has elapsed, the overlay layer may fade out from the screen, and the user may still select short videos in the same category that he/she wants to browse via a corresponding button on the remote control.

Figure 5:
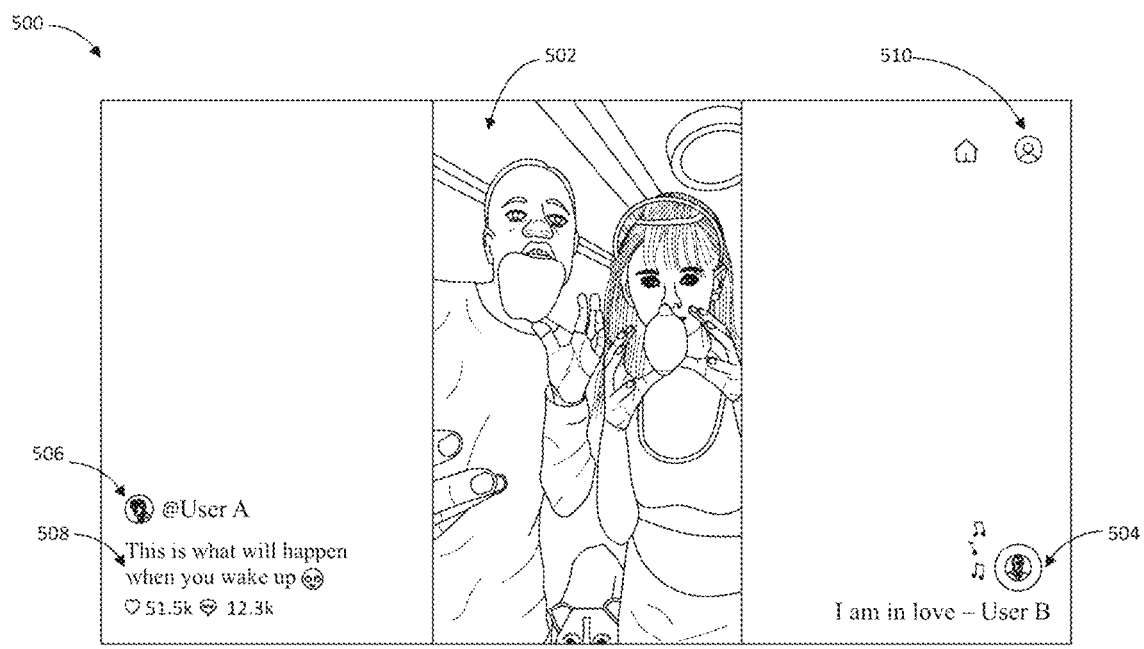
FIG. 5 shows a vertical display example user interface of a content application according to an embodiment of the present disclosure.

In an embodiment, in response to a switching instruction (e.g., an input from the remote control), the client device 130 may switch an interface in which cover images are superimposedly displayed on the video as shown in FIGS. 3A and 3B to an interface in which a video is displayed as shown in FIG. 4 or FIG. 5, or after a predetermined period of time has elapsed, switch an interface in which cover images are superimposedly displayed on the video as shown in FIGS. 3A and 3B to an interface in which a video is displayed as shown in FIG. 4 or FIG. 5

In another embodiment, the client device 130 may play the second video until the cloud network 102 receives another user input, which may also indicate that the user wants to browse different content from different categories. If the user wants to browse different content (such as short videos) in different categories, the user may select a second image from a subset of the cover images. The second image may be different from the first image, and may has different category from the category corresponding to the short video the user is browsing. At 216, the cloud network 102 may receive a second user input indicating to select the second image from the plurality of cover images, where the second image is different from the first image and corresponds to a second category, and the plurality of cover images are at least partially superimposedly displayed on the second video being played. That is, the user input indicating to select the second image is received, and the cloud network 102 may select the second image from the plurality of cover images in response to the second user input. The client device 130 may receive the user input indicating the second image when playing, for example, the second video in the first category. For example, if the user is browsing a short video from the "Recommended" category and decides to browse a short video of the "Followed" category, the user may select the second image corresponding to the "Followed" category via an operation of the remote control.

At 218, the cloud network 102 may automatically select a third video from the second category corresponding to the second image. For example, the cloud network 102 may automatically select the third video from the second category corresponding to the second image. As an example, the cloud network 102 may automatically select the third video based on predetermined characteristics, such as popularity of the short video, length of the short video, whether the short video is hot, attributes of the video, or a creator of the short video. Popularity of a short video may be indicated by an average content rating, the number of times the short video has been browsed, or the number of times the short video has been shared. In an embodiment, the cloud network 102 may automatically select a video from the second category corresponding to the second image, for example, may select a short video including an image frame of the second image as the third video. At 220, the cloud network 102 may acquire the third video, that is, content (e.g., a short video) in the category corresponding to the second image, from the database 104.

At 222, the cloud network 102 may send at least a part of the third video to the user equipment, so that the user equipment plays the third video, that is, send at least a part of the third video corresponding to the second image to the client device 130, so that the client device 130 plays the third video. The cloud network 102 sends at least a part of the third video to the client device 130, so that the client device 130 plays the third video, where the plurality of cover images are at least partially superimposedly displayed on the third video being played. The third video may be played on the client device 130 by using the content application 132. In an embodiment, the third video may be displayed on the user equipment for its duration. For example, if the selected third video is a short video with a duration of 30 seconds, the third video may be displayed on the user equipment for 30 seconds. Thereafter, if the content application 132 of the client device 130 is set to the "auto loop" mode, the third video may be displayed and played on the interface of the client device 130 again. If the content application 132 is set to the "non-auto loop" mode, the client device 130 may continue to play other videos in the same category as the third video after playing the third video.

The cloud network 102 may receive a second user input; select a second image from the plurality of cover images in response to the second user input, where the second image is different from the first image and corresponds to the second category; automatically select the third video from the second category corresponding to the second image; acquire the third video from the at least one database; and send at least a part of the third video to the user equipment, so that the user equipment plays the third video, where the plurality of cover images are at least partially superimposedly displayed on the third video being played Herein, the second user input may be received when the second video is being played by the user equipment, or the second user input may be received when other videos are being played.

FIG. 4 shows a user interface 400 displayed on the user equipment when an application is launched. The UI 400 may include an overlay area that provides prompt information to the user. At least a part of the plurality of videos includes pre-recorded audio overlay. When the user launches the application 132, the overlay area may quickly fade out of the UI 400. For example, one second after the user launches the application 132, the overlay area may fade out of the UI 400. In an embodiment, the overly area may automatically fade out after a predetermined period of time, such as five seconds. In another embodiment, if the user equipment receives any user input, such as the user clicking any button on the remote control device, the overly area may fade out from the UI 400. After the overlay layer fades out, the UI 400 may display a video.

The prompt information provided on the overlay area may prompt the user how to select various functions of the application 132. For example, as described above, the overlay area may include a "Next" icon 404 and a "Previous" icon 406. If the user wants to browse different content, the user may select the "Previous" icon 406 or the "Next" icon 404. If to select the "Next" icon 404, the user may click the "Right" button on the remote control device. If to select the "Previous" icon 406, the user may click the "Left" button on the remote control device. The overlay area may also include a "Menu" icon 402 and a "More options" icon 408. If the user selects the "Menu" icon 402, the user may browse a navigation bar of the application. If the user selects the "More options" icon 408, the user may browse additional options associated with a currently played short video, for example, options such as comments, likes, etc., or information associated with a creator of the short video. If to select the "Menu" icon 402, the user may click an "Up" button on the remote control device. If to select the "More options" icon 408, the user may click a "Down" button on the remote control device.

FIG. 5 shows a vertical display example UI 500 of the content application 132. The UI 500 may include displayed content, such as a short video 502. The short video 502 may include a single video displayed vertically. Title 508 may be associated with the short video 502. Title 508 may include a description related to the short video 502. In an embodiment, the title 508 may also include one or more hashtags, which further include words, phrases, or sentences related to the short video 502. The UI 500 may further include creator information 506. The creator information 506 may include information associated with a creator of the short video 502, and may include at least one of an icon or a creator name.

In an embodiment, the UI 500 may further include an audio information icon 504. The audio information 504 may indicate information of a characteristic audio segment, such as a pre-recorded audio overlay, of the short video 502. The audio segment may include a song or audio from movies, albums, or TV shows. The audio information 504 may include a rotating icon and a scrolling text indicating a name of the audio. For example, the audio information 504 may include a rotating icon of an artist or album associated with the song, and a scrolling text indicating a name of the song and/or a name of the artist. The UI 500 may further include a navigation bar 510. The navigation bar 510 may direct a user to a home screen of the application or the user's personal page.

Figure 6:
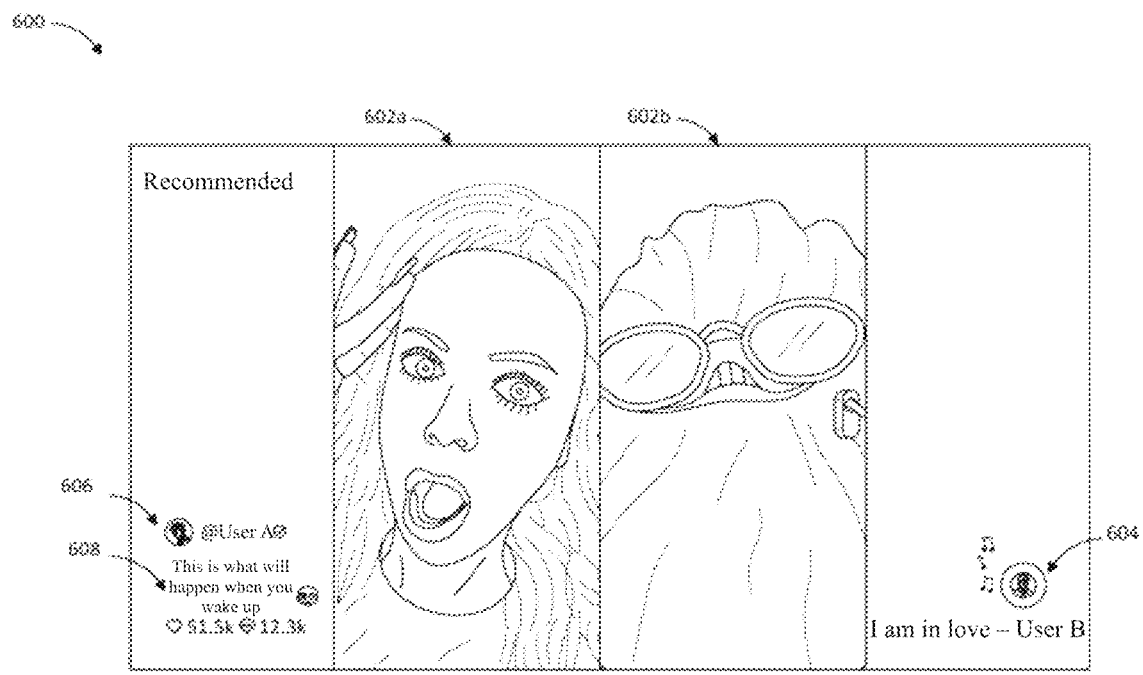
FIG. 6 shows another vertical display example user interface of a content application according to an embodiment of the present disclosure.

FIG. 6 shows another vertical display example UI 600 of the content application 132. UI 600 may include displayed contents 602*a-b*. The contents 602*a-b* may include two videos displayed next to each other, and each video is displayed vertically. In an embodiment, the two videos may include videos characterized by individual participation in duo lip-sync or dance. In another embodiment, one of the two videos, such as content 602*a*, may also be characterized by an individual in this video providing comments on another video, such as content 602*b*. Title 608 may be associated with the contents 602*a-b*. Title 608 may include words, phrases, or sentences related to the contents 602*a-b*. In an embodiment, the title 608 may include one or more hashtags, which further indicate words, phrases, or sentences related to the contents 602*a-b*. The UI 600 may further include creator information 606. The creator information 606 may include information associated with creation of the contents 602*a-b*, and may include at least one of an icon or a creator name.

In an embodiment, the UI 600 may include audio information 604. The audio information 604 may indicate information of a characteristic audio segment, such as a pre-recorded audio overlay, of the short videos 602*a-b*. The audio segment may include a song or audio from movies, albums, or TV shows. The audio information 604 may include a rotating icon and a scrolling text indicating a name of the audio. For example, the audio information 604 may include a rotating icon of an artist or album associated with the song, and a scrolling text indicating a name of the song and/or a name of the artist.

Figure 7:
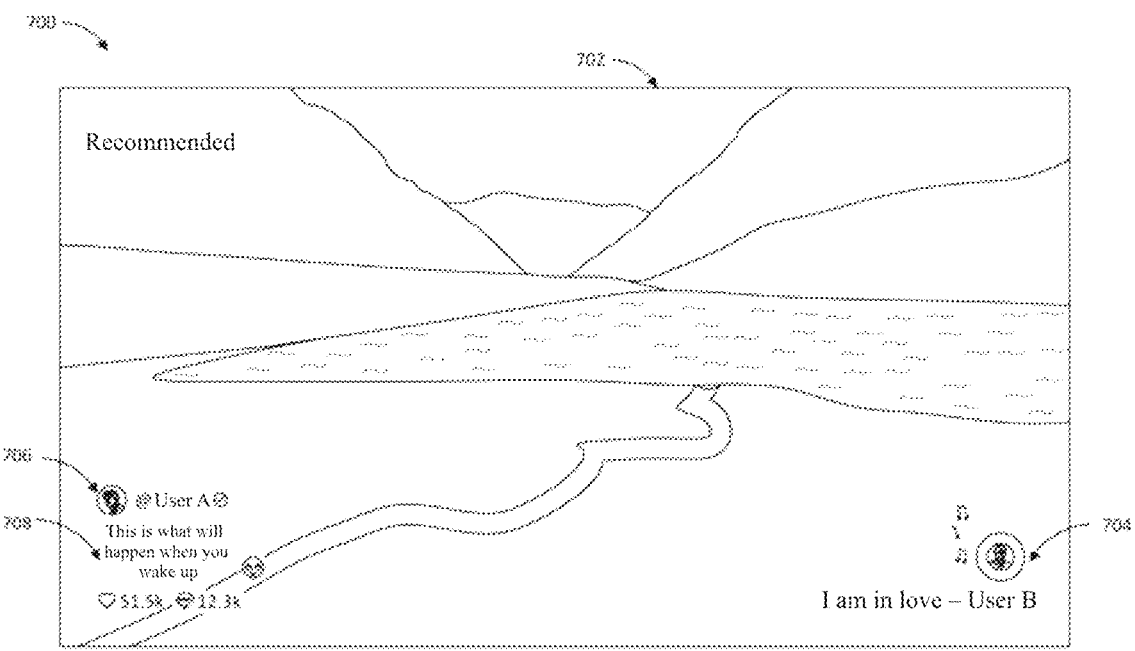
FIG. 7 shows a horizontal display example user interface of a content application according to an embodiment of the present disclosure.

FIG. 7 shows a horizontal display example UI 700 of the content application 132. The UI 700 may include displayed content 702. The content 702 may include a single video displayed horizontally. Title 708 may be associated with the content 702. Title 708 may include words, phrases, or sentences related to the content 702. In an embodiment, the title 708 may include one or more hashtags, which further include words, phrases, or sentences related to the content 702. The UI 700 may further include creator information 706. The creator information 706 may include information associated with creation of the content 702, and may include at least one of an icon or a creator name.

In an embodiment, the UI 700 may include audio information 704. The audio information 704 may indicate information of a characteristic audio segment, such as a pre-recorded audio overlay, of the short video 702. The audio segment may include a song or audio from movies, albums, or TV shows. The audio information 704 may include a rotating icon and a scrolling text indicating a name of the audio. For example, the audio information 704 may include a rotating icon of an artist or album associated with the song, and a scrolling text indicating a name of the song and/or a name of the artist.

Figure 8:
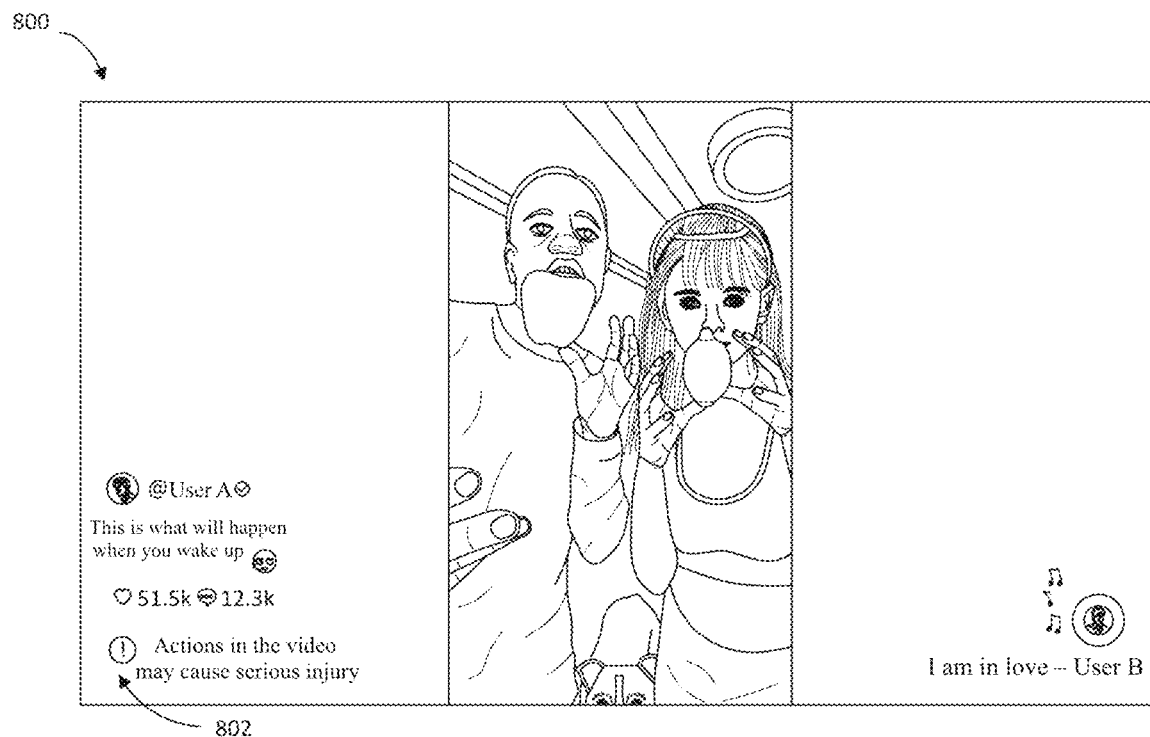
FIG. 8 shows another display example user interface of a content application according to an embodiment of the present disclosure.

FIG. 8 shows another display example UI 800 of the content application 132. The UI 800 may display a notification tag 802. The notification tag 802 may be generated by the short video service 106, and may indicate important information associated with a video displayed on the UI 800. For example, if the content being displayed by the UI 800 includes a video, the notification tag 802 may indicate that actions in the video may cause serious injury, thereby prompting users to avoid imitation to ensure user safety. In another example, the notification tag 802 may also indicate other associated information related to the video being played, for example, indicate that the video being played is about a certain news topic or certain educational information.

Figure 9:
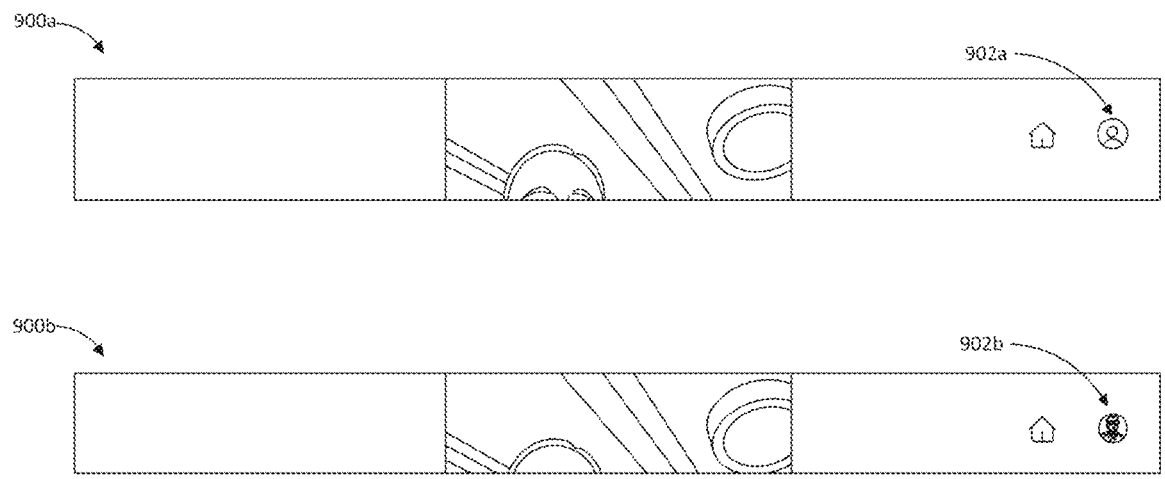
FIG. 9 shows a display example user interface of a navigation bar of a content application according to an embodiment of the present disclosure.

FIG. 9 shows a display example UI 900*a-b* of a navigation bar of the content application 132. The UI 900*a-b* may include a navigation bar, such as navigation bars 902*a* or 902*b*. The navigation bar may indicate whether a user is logged in to an account associated with the application. For example, when 902*a* is highlighted, it means that the user is logged in to the application. After a predetermined period of time (such as three seconds), the navigation bar may automatically fade out of the UI 900*a-b*.

In an embodiment, if the user is not logged in to the account associated with the application, the UI 900*a* may display a navigation bar 902*a* with a virtual user icon. The user may be directed to a login screen by clicking the virtual user icon. In an embodiment, when the user equipment is a smart TV, the user may log in to a personal account by scanning a two-dimensional code (e.g., a quick response (QR) code) on the smart TV.

In another embodiment, if the user logs in to the account associated with the application, the navigation bar 902*b* may be displayed in the UI 900*b*. The navigation bar 902*b* may display a highlighted user icon. The user may be directed to the user's personal page by clicking on the user icon 902*b*.

Figure 10:
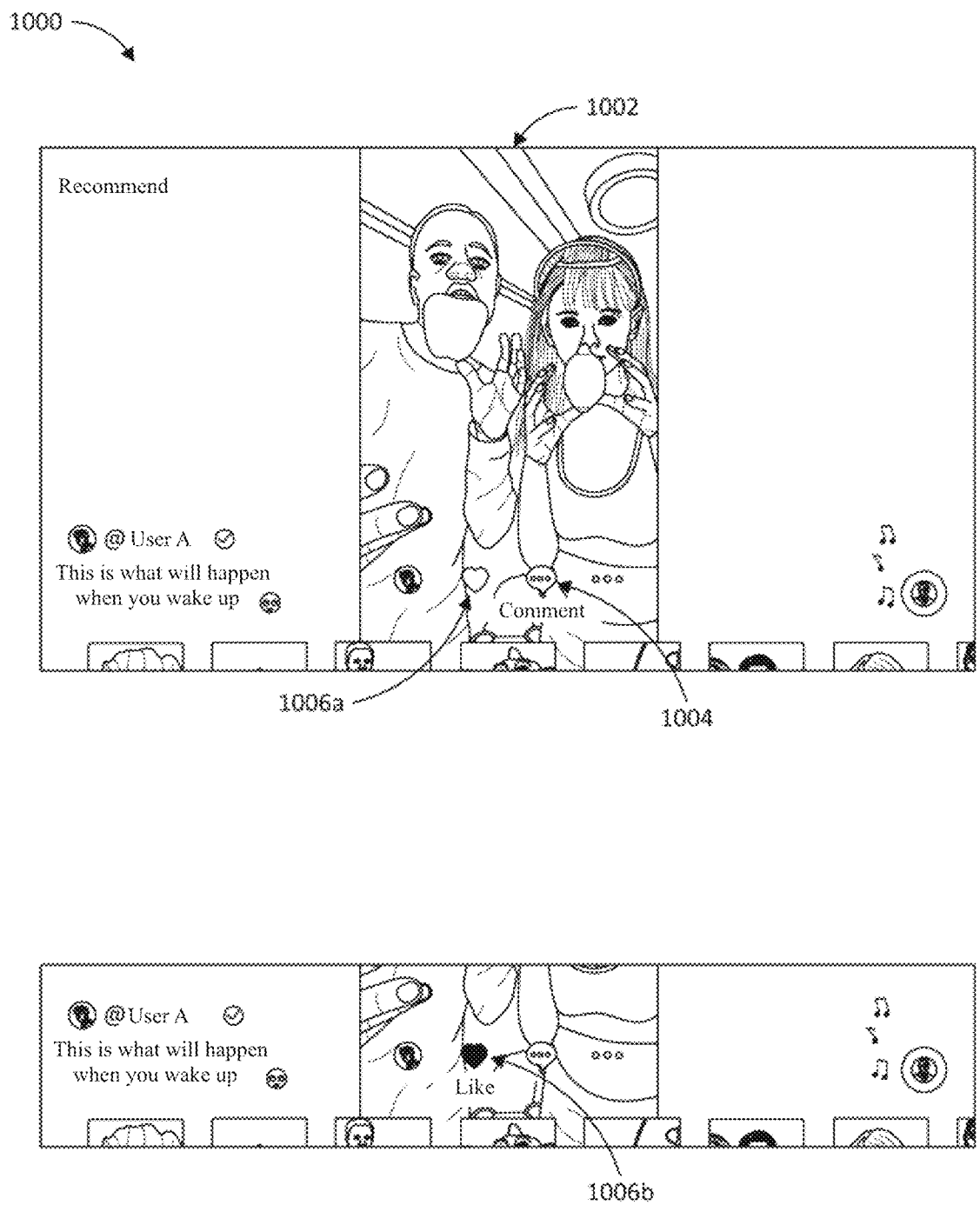
FIG. 10 shows another display example user interface of a content application according to an embodiment of the present disclosure.
Figure 11:
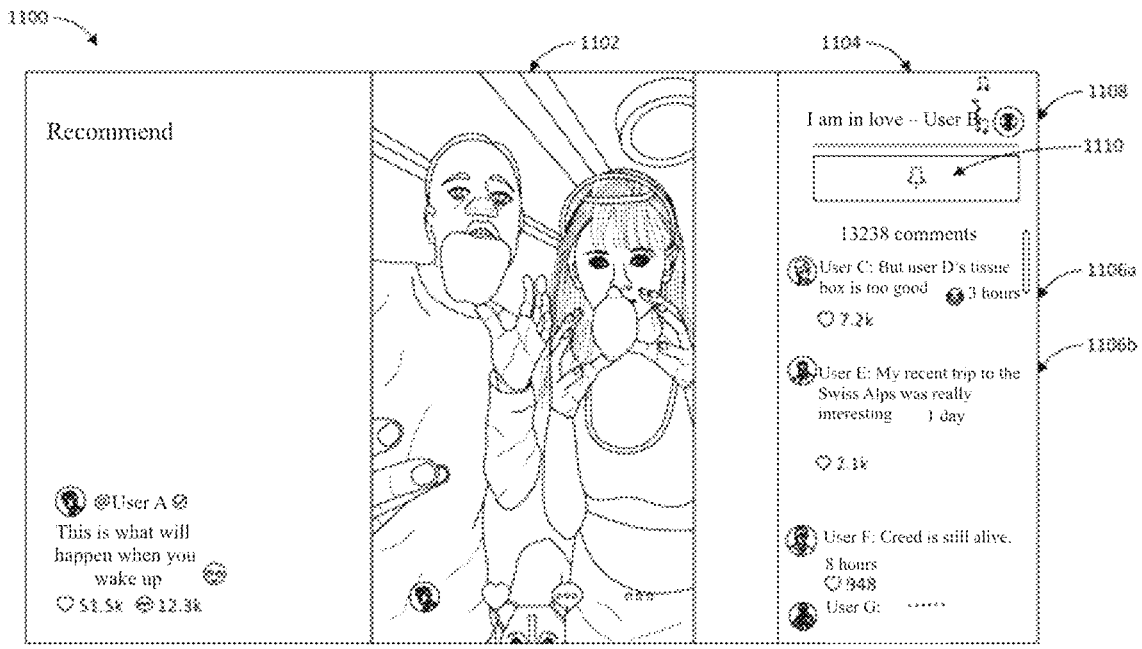
FIG. 11 shows another display example user interface of a content application according to an embodiment of the present disclosure.

FIG. 10 shows another display example UI 1000 of the content application 132. When the user equipment is a smart TV, a user may select a "Like" or "Comment" icon on the UI 1000 via a remote control device, to perform interactive operation on a currently playing video. The UI 1000 may include a currently playing video 1002, a "Comment" icon 1004, and a "Like" icon 1006. The user may select one or more of the "Like" or "Comment" icons to indicate the user's trigger operation on the displayed content 1002. In an embodiment, in response to a click operation of the remote control device (e.g., a click operation on the "Down" button), the user equipment may switch from the display interface such as FIGS. 5-7 to the UI 1000 including the "Comment" and "Like" icons and partial display of the plurality of cover images. In an embodiment, in the UI 1000 display interface, when the user equipment does not receive a user input within a predetermined period of time, the interface may be switched to the interface shown in FIGS. 5-7. In an embodiment, further in response to a click operation of the remote control device (e.g., a click operation on the "Down" button), the user equipment may switch from the UI 1000 including the "Comment" and "Like" icons and partial display of the plurality of cover images to the UI 300 including the full cover images superimposedly displayed on the video.

In an embodiment, the UI 1000 includes the "Like" icon 1006. By selecting the "Like" icon 1006, the user may choose to perform a like operation to the video 1002 being played, that is, to "like" or "dislike" the video 1002. For example, the user may select the "Like" icon 1006 by using the remote control device. If the user "dislikes" the video 1002, the "Like" icon 1006 may not be selected, and the "Like" icon 1006 may be displayed on the UI 1000 as a hollow shape or a gray heart shape. If the user likes the video 1002, he/she may perform a like operation to the "Like" icon 1002 by clicking a button on the remote control device, and accordingly, the "Like" icon 1006 may be displayed on the UI 1000 as a solid heart shape 1006*b*. The solid shape 1006*b* may be in various colors other than gray, such as red, which is not specifically limited herein, as long as it is distinguished from the corresponding display form when the "Like" icon 1006 is not selected. If the user does not want to like the content 1002, the user may select the "Like" icon 1006 again, and the "Like" icon 1006 is displayed as an unselected state.

In practical applications, each user account has a like list. If the user performs a like operation, the content 1002 may be added to the user's like list. The user may access the like list and watch some or all of the content he liked. The like list may be displayed as a grid, and each liked video in the grid may be dynamically displayed in the format of gif animation. If the user cancel liking the video 1002, he/she may delete the video 1002 from the like list. The user may like and add the video 1002 to the like list in a logged-in state or a not logged-in state. If the user is in the not logged-in state, the user may also be prompted to log in to his/her account. In an embodiment, the user may log in to his/her account by scanning a QR code on a smart TV.

In an embodiment, as shown in FIG. 10, the UI 1000 includes a plurality of cover images corresponding to different categories at the bottom of the display interface. In an embodiment, the user equipment may hide the plurality of cover images corresponding to these different categories in response to an instruction from a remote control device. In an embodiment, the UI 1000 includes the "Comment" icon 1004. By selecting the "Comment" icon 1004, the user may browse comments associated with the content 1002. For example, when a cursor on the interface is on the "Comment" icon 1004, the user may select the "Comment" icon 1004 by using the remote control device. If the user selects the "Comment" icon 1004, the UI 1000 may display comments associated with the content 1002 in a comment box. An exemplary comment box will be described below with reference to FIGS. 11 to 13.

A comment box 1104 may include at least one comment about content 1102, such as comments 1106*a-b*. In an embodiment, the at least one comment may be provided by one or more users through a comment service of the cloud network 102. The at least one comment may include a user icon and/or username of the user who entered the comment. The at least one comment may also include a time stamp indicating the time when the comment was input. In an embodiment, the comment box 1104 may include a total number of comments, which indicates how many users have entered comments about the displayed video 1102. The comment box 1104 may also include the number of likes received by each comment, and the number of likes received by each comment. The comments in the comment box 1104 may be sorted according to time stamps or popularity (such as according to the number of likes).

The comment box 1104 and the content 1102 may be displayed together on a same interface. For example, the comment box 1104 may be displayed in an overlay area above the content 1102, an overlay area next to the content 1102, or an overlay area below the content 1102. The at least one comment may be encoded in a format of the content 1102. For example, if the content 1102 is a video, the comment may be encoded into a video format. When the at least one comment is displayed in the comment box 1104, the video may be animated and displayed.

The comment box 1104 may also display audio information, such as audio information 1108. In an embodiment, the audio information may be located at the top of the comment box 1104. The audio information may provide information about a characteristic audio segment, such as a pre-recorded audio overlay, of the content 1102. The audio segment may include a song or audio from movies, albums, or TV shows. The audio information may include a rotating icon and a scrolling text indicating a name of the audio. For example, if a song segment is a feature in the content 1102, the audio information may include a rotating icon of an artist or album associated with the song, and a scrolling text indicating a name of the song. In an embodiment, the comment box 1104 may include an icon 1110 for fixing the comment box 1104. For example, when the cursor is on the icon 1110, the comment box 1104 may be fixed in response to a received operation instruction for the icon 1110 sent by the remote control device; if an operation instruction for the icon 1110 sent by the remote control device is received again, the comment box 1104 is unfixed.

Figure 12:
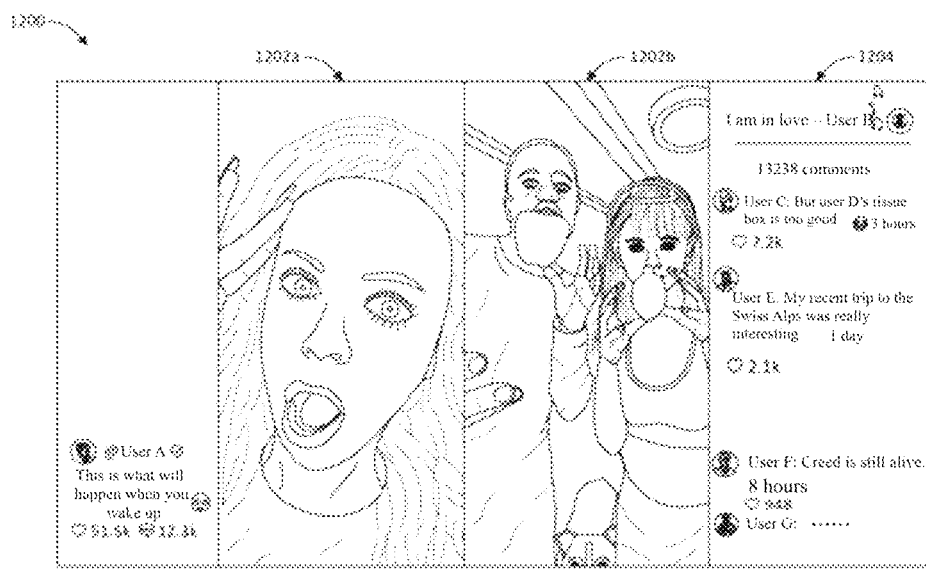
FIG. 12 shows another display example user interface of a content application according to an embodiment of the present disclosure.

FIG. 12 shows another display example UI 1200 of the content application 132. A comment box may include comments on displayed content entered by a user of the content application. For example, the UI 1200 may include displayed contents 1202*a-b* and a comment box 1204. The contents 1202*a-b* may include two videos displayed next to each other, and each video is displayed vertically. In an embodiment, the two videos may include videos characterized by individual participation in duo lip-sync or dance. In another embodiment, one of the two videos, such as content 1202*a*, may also be characterized by an individual in this video providing comments on another video, such as content 1202*b*. A user of the content application may browse the comments in the comment box by using a remote control device. For example, the user may click a button on the remote control device, such as the "Right" button, to open or close the comment box. After the comment box is opened, the user may click the "Up" or "Down" button on the remote control device to scroll through the comments. The UI 1200 may move the contents 1202*a-b* being played to provide a display space for the comment box.

The comment box 1204 may include at least one comment about the contents 1202*a-b*. In one embodiment, the at least one comment may be provided by one or more users through the comment service of the cloud network 102. The at least one comment may include a user icon and/or username of the user who entered the comment. The at least one comment may also include a time stamp of the time when the comment was input. In one embodiment, the comment box 1204 may include a total number of comments, which indicates how many users have entered comments about the displayed videos 1202a-b. The comment box 1204 may also include the number of likes received by each comment, that is, the number of likes received by each comment. The comments in the comment box 1204 may be sorted according to time stamps or popularity (such as according to the number of likes).

The comment box 1204 and the contents 1202a-b may be displayed together on a same interface. For example, the comment box 1204 may be displayed in an overlay area above the contents 1202a-b, an overlay area next to the contents 1202a-b, or an overlay area below the contents 1202a-b. The at least one comment may be encoded in a format of the contents 1202a-b. For example, if the contents 1202a-b are videos, the comment may be encoded into a video format. When the comment is displayed in the comment box 1204, the comment may be encoded into a video format for animation display. For example, the comments may be scrollingly displayed (e.g., from right to left, from left to right, from top to bottom, from bottom to top, etc., which is not limited herein) on the contents 1202a-b or the overlay area.

Figure 13:
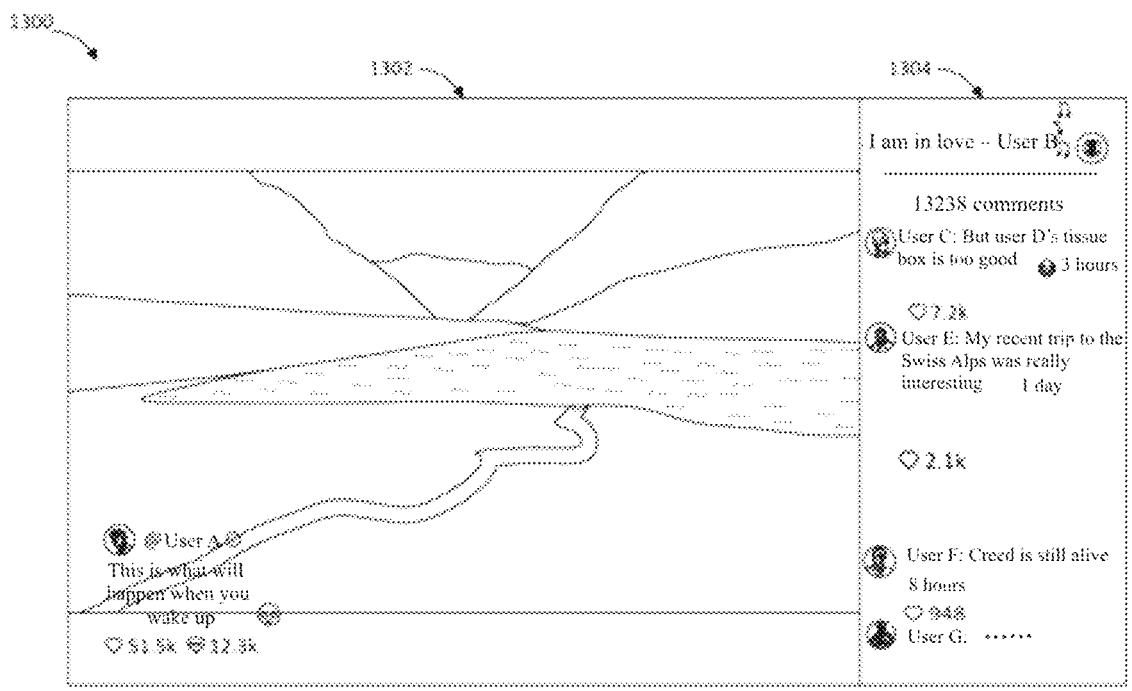
FIG. 13 shows another display example user interface of a content application according to an embodiment of the present disclosure.

FIG. 13 shows another display example UI 1300 of the content application 132. A comment box may include comments on displayed content entered by a user of the content application. For example, the UI 1300 may include displayed content 1302 and a comment box 1304. The content 1302 may include single video content displayed horizontally. A user of the content application may browse the comments in the comment box by using a remote control device. For example, the user may click a button on the remote control device, such as the "Right" button, to open or close the comment box. After the comment box is opened, the user may click the "Up" or "Down" button on the remote control device to scroll through the comments. The UI 1300 may move the content 1302 being played to provide a display space for the comment box.

The comment box 1304 may include at least one comment about the content 1302. In one embodiment, the at least one comment may be provided by one or more users through the comment service of the cloud network 102. The at least one comment may include a user icon and/or username of the user who entered the comment. The at least one comment may also include a time stamp of the time when the comment was input. In one embodiment, the comment box 1304 may include a total number of comments, which indicates how many users have entered comments about the displayed video 1302. The comment box 1304 may also include the number of likes received by each comment, that is, the number of likes received by each comment. The comments in the comment box 1304 may be sorted according to time stamps or popularity (such as according to the number of likes).

The comment box 1304 and the content 1302 may be displayed together on a same interface. For example, the comment box 1304 may be displayed in an overlay area above the content 1302, an overlay area next to the content 1302, or an overlay area below the content 1302. The at least one comment may be encoded in a format of the content 1302. For example, if the content 1302 is a video, the comment may be encoded into a video format. When the comment is displayed in the comment box 1304, the comment may be encoded into a video format for animation display. For example, the comments may be scrollingly displayed (e.g., from right to left, from left to right, from top to bottom, from bottom to top, etc., which is not limited herein) on the content 1302 or the overlay area.

Figure 14:
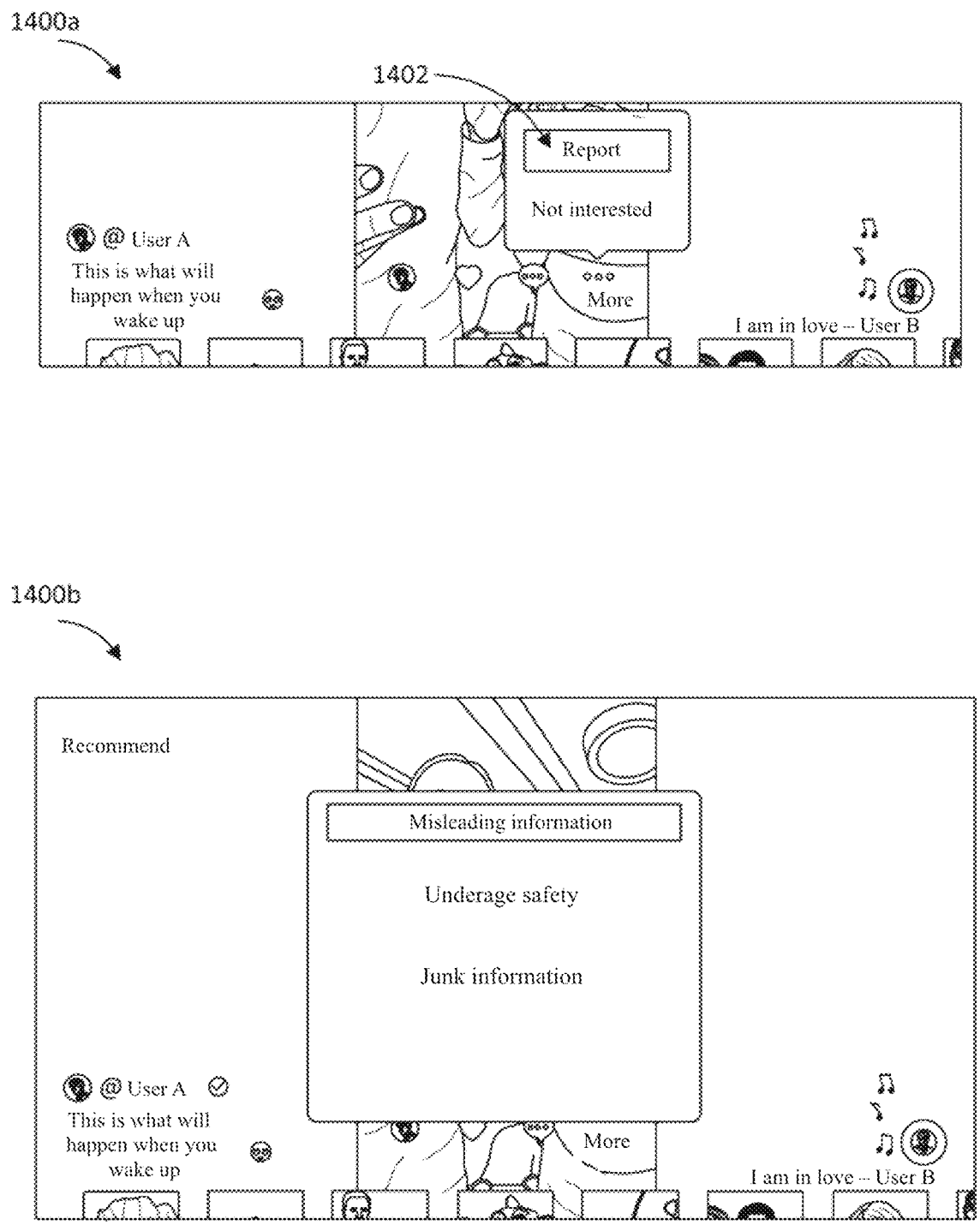
FIG. 14 shows another display example user interface of a content application according to an embodiment of the present disclosure.

FIG. 14 shows another display example UIs 1400a-b of the content application 132. The UIs 1400a-b may display content such as videos. If a user wants to feedback displayed content, the user may trigger the UI 1400 to display a feedback list by triggering a corresponding button on a remote control device. The feedback list may include a "Report" icon 1402 and a "Not interested" icon.

In an embodiment, a more information button reported may be accessed by selecting a corresponding icon on UI 1400a, such as the "Report" icon displayed in the UI 1400. When the user selects the "Report" icon, the UI 1400b may display an option list for the user to select. The option list may include a list of potential reasons explaining what the user wants to report. For example, the option list may include at least "misleading information", "underage safety", "junk information", and so on. One or more reason options in the list may further include sub-options. For example, the reason option of "underage safety" may include sub-options such as "not suitable for juveniles". The user may select a reason and a sub-option (if any) from the list, and report the reason. After the user selects the reason from the list, the UI 1400b may display a confirmation message indicating that the displayed content has been reported. In an embodiment, the user may also choose to "block" the creator of the reported content.

Figure 15:
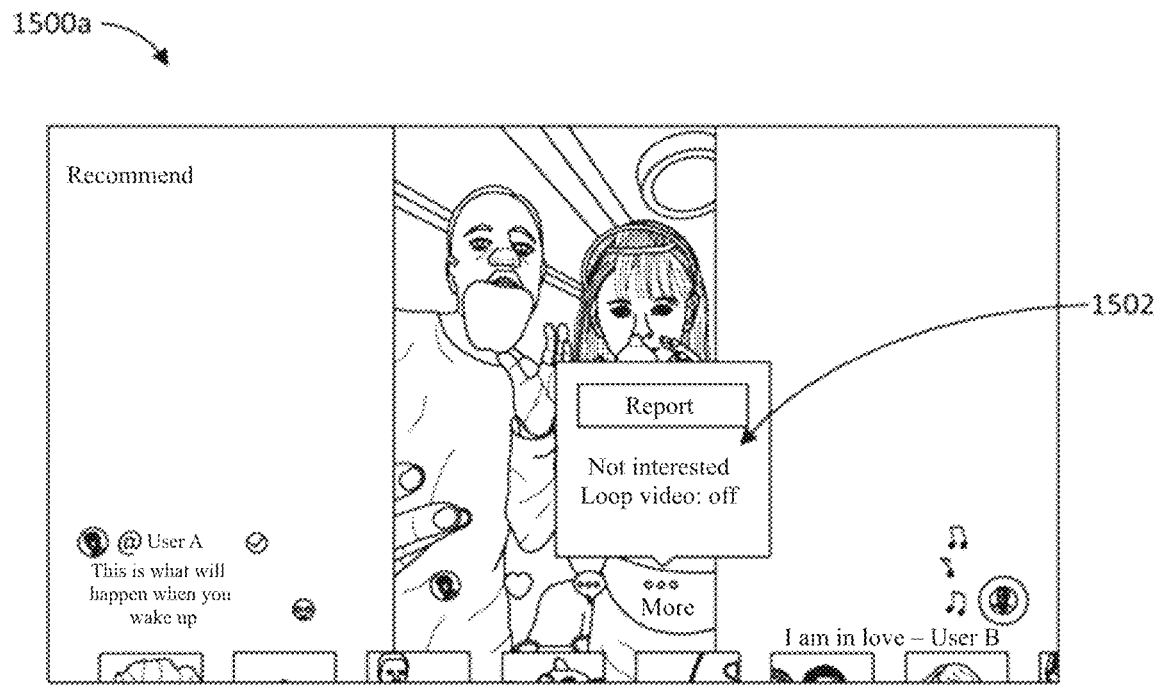
FIG. 15 shows another display example user interface of a content application according to an embodiment of the present disclosure.

FIG. 15 shows another display example UI 1500 of the content application 132. The UI 1500 may display content such as videos. If the user is not interested in displayed content, the user may select a "Not interested" icon 1502 on the UI 1500. In addition, the UI 1500 may also display an option icon for setting a video loop playback mode, such as "loop video: off", and the user may choose, on the UI 1500, to turn off or turn on again the setting for the video loop playback mode.

Figure 16:
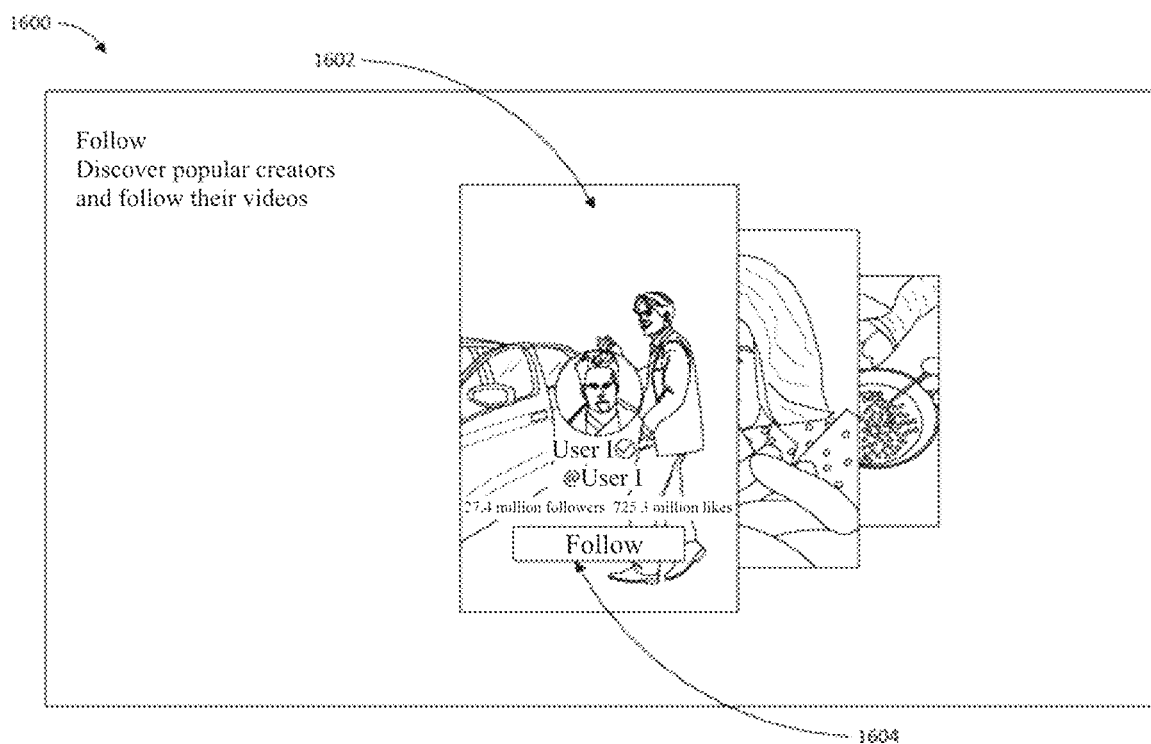
FIG. 16 shows another display example user interface of a content application according to an embodiment of the present disclosure.

FIG. 16 shows another display example UI 1600 of the content application 132. Each distributed content may be associated with an individual creator or corporate creator who created the content. Each creator may have a personal page, which includes information about the creator and all related content of the creator. Some creator pages on the application may also be "Certified" pages. A certified creator page may include a blue check mark to indicate that the creator is a certified creator.

In an embodiment, a creator page may include a page icon, a user name, a name, the number of users following the creator, or the number of likes the creator receives on its content. The creator page may include a background card, and a video of content created by the creator may need to be played on the background card. In order to access the creator page as shown in FIG. 16, a user may click the page icon or the user name, such as the creator information 506 of the UI 500 in FIG. 5, while browsing the displayed content.

After the user accesses the creator page, the UI 1600 may display a "Follow" icon 1604. For example, if the user wants to follow the creator, the user may select the "Follow" icon. If the user knows the creator, or the user appreciates the creator's content, the user may wish to follow the creator page. The user may use a remote control device to switch between different creator pages. For example, the user may click the "Left" or "Right" button on the remote control device to scroll to display different creator pages. If the user is not logged in to the account and selects the "Follow" icon 1604, the user may be prompted to log in to the account. In an embodiment, when the user equipment is a smart TV, the user may log in to the account by scanning a QR code on the smart TV.

In an embodiment, based on the same inventive concept as the above method, an embodiment of the present disclosure further provides a video distribution method performed by a video distribution system, the method comprising:

classifying a plurality of videos into a plurality of categories based on attributes associated with the plurality of videos; determining a plurality of cover images, the plurality of cover images respectively corresponding to the plurality of categories; sending the plurality of cover images to a user equipment, so that the plurality of cover images are at least partially superimposedly displayed on a first video being played; selecting a first image from the plurality of cover images in response to a first user input; automatically selecting a second video from a first category corresponding to the first image; acquiring the second video; and sending at least a part of the second video to the user equipment to play the second video, where the plurality of cover images are at least partially superimposedly displayed on the second video being played.

In this embodiment, with the above method, by firstly classifying the plurality of videos into a plurality of categories based on attributes associated with the plurality of videos; determining a plurality of cover images respectively corresponding to the plurality of categories; sending the plurality of cover images to a user equipment, so that the plurality of cover images are at least partially superimposedly displayed on a first video being played; then selecting a first image from the plurality of cover images in response to a first user input, and automatically selecting a second video from a first category corresponding to the first image; and sending at least a part of the second video to the user equipment to play the second video, where the plurality of cover images are at least partially superimposedly displayed on the second video being played, users are provided with the convenience of watching a plurality of target videos and a plurality of pictures in a same user interface, thereby enabling convenient ways and operations for the users to access and watch videos on various video platforms and devices, meeting requirements of the users, and providing the users with better viewing experience.

In an embodiment, the method further comprises:

receiving a second user input indicating to select a second image from the plurality of cover images, where the second image is different from the first image and corresponds to a second category, and the plurality of cover images are at least partially superimposedly displayed on the second video being played; automatically selecting a third video from the second category corresponding to the second image; acquiring the third video; and sending at least a part of the third video to the user equipment, so that the user equipment plays the third video, where the plurality of cover images are at least partially superimposedly displayed on the third video being played.

In an embodiment, at least a part of the plurality of videos includes a pre-recorded audio overlay. In an embodiment, before responding to the first user input, the method further comprises: receiving the first user input from a remote control device associated with the user equipment.

In an embodiment, the user equipment includes a smart TV.

In an embodiment, at least a part of the plurality of videos includes short videos.

The video distribution method is performed by a video distribution system. Those skilled in the art can clearly understand that, for convenience and conciseness of the description, specific working processes of the video distribution method described above may refer to corresponding processes in the foregoing system embodiment, which is not repeatedly described herein.

Based on the same inventive concept as the method, an embodiment of the present disclosure also provide a computing device including a processor and a memory.

The memory is used to store programs for executing the methods described in the foregoing various video distribution method embodiments; the processor is configured to execute the programs stored in the memory, and when the programs are executed by the processor, the processor may perform the following operations:

classifying a plurality of videos into a plurality of categories based on attributes associated with the plurality of videos; determining a plurality of cover images, the plurality of cover images respectively corresponding to the plurality of categories; sending the plurality of cover images to a user equipment, so that the plurality of cover images are at least partially superimposedly displayed on a first video being played; selecting a first image from the plurality of cover images in response to a first user input; automatically selecting a second video from a first category corresponding to the first image; acquiring the second video; and sending at least a part of the second video to the user equipment to play the second video, where the plurality of cover images are at least partially superimposedly displayed on the second video being played.

In an embodiment, when the programs are executed by the processor, the processor may further perform the following operations:

receiving a second user input indicating to select a second image from the plurality of cover images, where the second image is different from the first image and corresponds to a second category, and the plurality of cover images are at least partially superimposedly displayed on the second video being played; automatically selecting a third video from the second category corresponding to the second image; acquiring the third video; and sending at least a part of the third video to the user equipment, so that the user equipment plays the third video, where the plurality of cover images are at least partially superimposedly displayed on the third video being played.

In an embodiment, at least a part of the plurality of videos includes a pre-recorded audio overlay. In an embodiment, when the programs are executed by the processor, the processor may further perform the following operation: before responding to the first user input, receiving the first user input from a remote control device associated with the user equipment.

In an embodiment, the user equipment includes a smart TV, and at least a part of the plurality of videos includes short videos.

Figure 17:
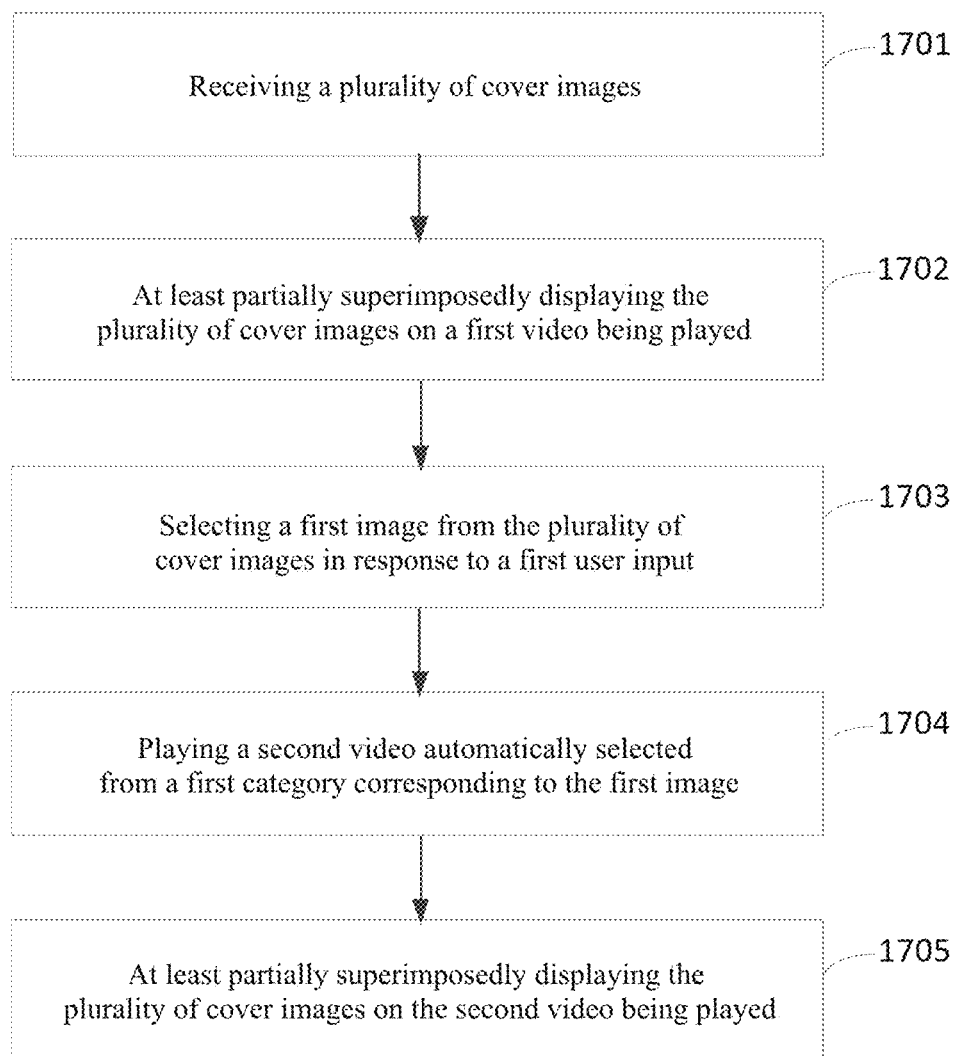
FIG. 17 shows a flowchart of a video playing method provided according to an embodiment of the present disclosure.

An embodiment of the present disclosure also provides a video playing method performed by a user equipment. Referring to FIG. 17, it is a schematic flowchart of a video playing method provided by an embodiment of the present disclosure. The method may be performed by a user equipment. The user equipment may include a mobile terminal such as a smart terminal, a notebook, a digital broadcast receiver, a personal digital assistant, a tablet, a portable multimedia player, a vehicle terminal (e.g., a vehicle navigation terminal), a wearable device, etc., as well as a terminal such as a digital TV, a desktop computer, a smart home device (such as a smart TV), etc. The video playing method provided in the embodiment of the present disclosure comprises:

Step 1701: receive a plurality of cover images respectively corresponding to a plurality of categories, each of the plurality of categories including a plurality of videos.

Step 1702: at least partially superimposedly display the plurality of cover images on a first video being played.

Step 1703: select a first image from the plurality of cover images in response to a first user input.

Step 1704: play a second video automatically selected from a first category corresponding to the first image.

Step 1705: at least partially superimposedly display the plurality of cover images on the second video being played.

In some of the embodiments of the present disclosure, the video playing method may further comprise:

receiving a second user input; selecting a second image from the plurality of cover images in response to the second user input, where the second image is different from the first image and corresponds to a second category; playing a third video automatically selected from the second category corresponding to the second image; and at least partially superimposedly displaying the plurality of cover images on the third video being played.

In an embodiment, at least a part of the plurality of videos includes a pre-recorded audio overlay.

In an embodiment, before responding to the first user input, the method further comprises: receiving the first user input from a remote control device associated with the user equipment.

In an embodiment, the user equipment includes a smart TV.

It should be understood that an interface displayed by the user equipment according to the embodiment of the present disclosure may be described in conjunction with the forgoing FIG. 3 to FIG. 16, which are not repeatedly described herein for the sake of brevity.

Based on the same inventive concept as the foregoing video playing method, an embodiment of the present disclosure also provide a user equipment including a processor and a memory. The memory is used to store programs for executing the methods described in the foregoing various video playing method embodiments; the processor is configured to execute the programs stored in the memory, and when the programs are executed by the processor, the processor may perform the following operations:

receiving a plurality of cover images respectively corresponding to a plurality of categories, each of the plurality of categories including a plurality of videos; at least partially superimposedly displaying the plurality of cover images on a first video being played; selecting a first image from the plurality of cover images in response to a first user input; playing a second video automatically selected from a first category corresponding to the first image; and at least partially superimposedly displaying the plurality of cover images on the second video being played.

In some of the embodiments of the present disclosure, when the programs are executed by the processor, the processor may further perform the following operations:

receiving a second user input; selecting a second image from the plurality of cover images in response to the second user input, where the second image is different from the first image and corresponds to a second category; playing a third video automatically selected from the second category corresponding to the second image; and at least partially superimposedly displaying the plurality of cover images on the third video being played.

In an embodiment, at least a part of the plurality of videos includes a pre-recorded audio overlay.

In an embodiment, when the programs are executed by the processor, the processor may further perform the following operation: before responding to the first user input, receiving the first user input from a remote control device associated with the user equipment.

In an embodiment, the user equipment includes a smart TV.

It should be understood that an interface displayed by the user equipment according to the embodiment of the present disclosure may be described in conjunction with the forgoing FIG. 3 to FIG. 16, which are not repeatedly described herein for the sake of brevity.

Figure 18:
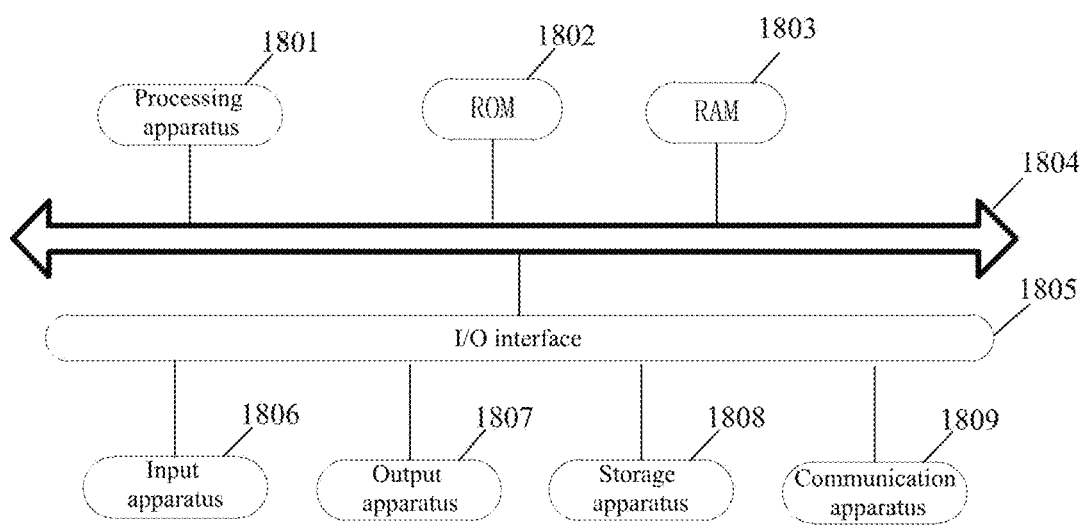
FIG. 18 shows a schematic structural diagram of an electronic device provided according to an embodiment of the present disclosure.

Referring to FIG. 18, it shows a schematic structural diagram of an electronic device suitable for implementing the embodiments of the present disclosure. The electronic device may be a server in a video distribution system or a user equipment. The user equipment herein may include but not limited to mobile terminals such as smart terminals, notebooks, digital broadcast receivers, Personal Digital Assistants (abbreviated as PDAs), Portable Android Devices (abbreviated as PADs), Portable Media Players (abbreviated as PMPs), vehicle terminals (e.g., vehicle navigation terminals), wearable devices and the like, and terminals such as digital TVs, desktop computers, smart home devices (such as smart TVs) and the like. The electronic device shown in FIG. 18 is only an example, and should not bring any limitation to the function and scope of use of the embodiments of the present disclosure.

As shown in FIG. 18, the electronic device may include a processing apparatus (e.g., a central processing unit, a graphics processor, etc.) 1801, which may perform various appropriate actions and processing to realize the video distribution function or the video playback function as described above according to programs stored in a Read Only Memory (abbreviated as ROM) 1802 or programs loaded from a storage apparatus 1808 into a Random Access Memory (abbreviated as RAM) 1803. In the RAM 1803, various programs and data required for operations of the user equipment are also stored. The processing apparatus 1801, the ROM 1802, and the RAM 1803 are connected to each other through a bus 1804. An input/output (I/O) interface 1805 is also connected to the bus 1804.

Generally, the following apparatuses may be connected to the I/O interface 1805: an input apparatus 1806 including, for example, a touch screen, a touch pad, a keyboard, a mouse, a camera, a microphone, an accelerometer, a gyroscopes, etc.; an output apparatus 1807 including, for example, a screen, a speaker, a vibrator, etc.; a storage apparatus 1808 including, for example, a magnetic tape, a hard disk, etc.; and a communication apparatus 1809. The communication apparatus 1809 may allow the user equipment to perform wireless or wired communication with other equipment to exchange data. Although FIG. 18 shows a user equipment with various apparatuses or a server device in a video distribution system, it should be appreciated that it is not required to implement or provide all the illustrated apparatuses. Alternatively, more or fewer apparatuses may be implemented or provided.

It should be appreciated that the methods and systems are not limited to specific methods, specific components, or specific implementations. It should also be appreciated that the terms used herein are only for the purpose of describing specific embodiments and are not intended to be limiting.

As used in the specification and appended claims, the singular forms "a", "an" and "the" include plural referents, unless otherwise explicitly stated in the context. A range may be expressed herein as from "about" one specific value and/or to "about" another specific value. When expressing such a range, another embodiment includes from one specific value and/or to another specific value. Similarly, when a value is expressed as an approximation by using the antecedent "about", it will be appreciated that the specific value forms another embodiment. It will also be appreciated that an endpoint of each range is important relative to and independent of the other endpoint.

"Optional" or "optionally" means that the event or situation described later may or may not occur, and the description includes the case in which the event or situation occurs and the case in which the event or situation does not occur.

Throughout the specification and claims of this specification, the word "include" and variations of the word, such as "includes" and "including", means "including but not limited to" and is not intended to exclude, for example, other components, integers, or steps. "Exemplary" means "an example" and is not intended to convey an indication of a preferred or ideal embodiment. "Such as" is not restrictive, but for explanatory purposes.

In particular, according to an embodiment of the present disclosure, the process described above with reference to the flowchart may be implemented as a computer software program. For example, an embodiment of the present disclosure includes a computer program product, which includes a computer program carried on a computer-readable medium, and the computer program contains program codes for performing the method shown in the flowchart. For example, the computer program includes a program for performing the video distribution method according to the embodiments of the present disclosure or the video playing method according to the embodiments of the present disclosure. In such embodiment, the computer program may be downloaded and installed from the network via the communication apparatus 1809, or installed from the storage apparatus 1808, or installed from the ROM 1802. When the computer program is executed by the processing apparatus 1801, the above-mentioned functions defined in the methods of the embodiments of the present disclosure are performed. For example, the electronic device may be a computing device or a user equipment, the above-mentioned video distribution method may be performed by the computing device; and the above-mentioned video playing method may also be performed by the user equipment.

It should be noted that the above-mentioned computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or any combination thereof. More specific examples of the computer-readable storage medium may include, but is not limited to: electrical connection with one or more wires, a portable computer disk, a hard disk, a Random Access Memory (RAM), a Read-Only Memory (ROM), an erasable Programmable read-only memory (EPROM or flash memory), an optical fiber, a portable Compact Disk Read-Only Memory (CD-ROM), an optical storage device, a magnetic storage device, or any suitable combination thereof. In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, in which a computer-readable program code is carried. This propagated data signal may take a plurality of forms, including but not limited to electromagnetic signals, optical signals, or any suitable combination thereof. The computer-readable signal medium may also be any computer-readable medium other than the computer-readable storage medium. The computer-readable signal medium may send, propagate, or transmit a program for use by or in combination with an instruction execution system, apparatus, or device. The program code contained on the computer-readable medium may be transmitted by using any suitable medium, including but not limited to: wires, optical cables, RF (Radio Frequency), etc., or any suitable combination thereof.

The above-mentioned computer-readable medium may be included in the above-mentioned electronic device; or it may exist alone without being assembled into the electronic device.

The above-mentioned computer-readable medium carries one or more programs, and when the foregoing one or more programs are executed by the electronic device, the electronic device is caused to perform the methods shown in the foregoing embodiments.

The computer program code used to perform the operations of the present disclosure may be written in one or more programming languages or a combination thereof. The above-mentioned programming languages include object-oriented programming languages such as Java, Smalltalk, C++, and also include conventional procedural programming language such as "C" language or similar programming languages. The program code may be executed entirely on a user's computer, partly on a user's computer, executed as an independent software package, partly executed on a user's computer and partly executed on a remote computer, or entirely executed on a remote computer or media library. In the case where a remote computer is involved, the remote computer may be connected to a user's computer through any kind of networks—including a Local Area Network (LAN) or a Wide Area Network (WAN), or it may be connected to an external computer (e.g., via an Internet connection by using an Internet service provider).

The flowcharts and block diagrams in the accompanying drawings illustrate possible architectures, functions, and operations of the system, method, and computer program product according to various embodiments of the present disclosure. In this regard, each block in the flowcharts or block diagrams may represent a module, program segment, or part of code, and the module, program segment, or part of code contains one or more executable instructions for realizing specified logic functions. It should also be noted that, in some alternative implementations, functions marked in the blocks may also occur in a different order from the order marked in the drawings. For example, two blocks shown in succession may actually be performed substantially in parallel, and they may sometimes be performed in a reverse order, depending on the functions involved. It should also be noted that, each block in the block diagrams and/or flowcharts, and a combination of the blocks in the block diagrams and/or flowcharts, may be implemented by a dedicated hardware-based system that performs specified functions or operations, or it may be implemented by a combination of dedicated hardware and computer instructions.

The units involved in the embodiments described in the present disclosure may be implemented in software or hardware. A name of a unit does not constitute a limitation on the unit itself under certain circumstances.

The functions described hereinabove may be performed at least in part by one or more hardware logic components. By way of example and not limitation, exemplary types of hardware logic components that can be used include: Field Programmable Gate Arrays (FPGAs), Application Specific Integrated Circuits (ASICs), Application Specific Standard Products (ASSPs), System on Chip (SOC), Complex Programmable Logical devices (CPLDs) and so on.

In the context of the present disclosure, a machine-readable medium may be a tangible medium, which may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, device, or device, or any suitable combination thereof. More specific examples of the machine-readable storage medium include electrical connection based on one or more wires, a portable computer disk, a hard disk, a Random Access Memory (RAM), a Read-Only Memory (ROM), an Erasable Programmable Read-Only Memory (EPROM or flash memory), an optical fiber, a portable Compact Disk Read-Only Memory (CD-ROM), an optical storage device, a magnetic storage device, or any suitable combination thereof.

The above description is only preferred embodiments of the present disclosure and an explanation of the applied technical principles. Those skilled in the art should appreciated that the scope of disclosure involved in this disclosure is not limited to technical solutions formed by specific combinations of the above technical features, and should also cover other technical solutions formed by arbitrarily combining the above technical features or their equivalent features without departing from the above disclosed concepts, for example, technical solutions formed by replacing the above-mentioned features with technical features disclosed in the present disclosure (but not limited to) having similar functions.

In addition, although various operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of individual embodiments may also be implemented in combination in a single embodiment. Conversely, various features described in the context of a single embodiment may also be implemented in a plurality of embodiments individually or in any suitable sub-combination.

Although the subject matter has been described in languages specific to structural features and/or method logical actions, it should be appreciated that the subject matters defined in the appended claims are not necessarily limited to the specific features or actions described above. Rather, the specific features and actions described above are merely exemplary forms of implementing the claims.

What is claimed is:

1. A video distribution system, comprising:
  at least one database storing a plurality of videos; and
  a computing device communicatively connected with the at least one database and configured to:
   classify the plurality of videos into a plurality of categories based on attributes associated with the plurality of videos;
   determine a plurality of cover images for the plurality of categories respectively, wherein one frame of image in a video of a first category is determined as a cover image for the first category;
   send the plurality of cover images to a user equipment, wherein the plurality of cover images are displayed synchronously with a first video being played and are displayed at least partially superimposed on the first video being played;
   select a first image from the plurality of cover images in respond to a first user input;
   automatically select a second video from a first category corresponding to the first image;
   acquire the second video from the at least one database; and
   send at least a part of the second video to the user equipment to play the second video, wherein the plurality of cover images are displayed synchronously with the second video being played and are displayed at least partially superimposed on the second video being played.

2. The system of claim 1, wherein the at least one computing device is further configured to:
  receive a second user input indicating to select a second image from the plurality of cover images, wherein the second image is different from the first image and corresponds to a second category, and the plurality of cover images are at least partially superimposedly displayed on the second video being played;
  automatically select a third video from the second category corresponding to the second image;
  acquire the third video from the at least one database; and
  send at least a part of the third video to the user equipment, wherein the user equipment plays the third video, wherein the plurality of cover images are at least partially superimposedly displayed on the third video being played.

3. The system of claim 1, wherein at least a part of the plurality of videos includes a pre-recorded audio overlay.

4. The system of claim 1, wherein the first user input is received from a remote control device associated with the user equipment.

5. The system of claim 4, wherein the user equipment includes a smart TV.

6. The system of any one of claim 1, wherein at least a part of the plurality of videos includes short videos.

7. A video distribution method, comprising:
  classifying a plurality of videos into a plurality of categories based on attributes associated with the plurality of videos;
  determining a plurality of cover images for the plurality of categories respectively, wherein one frame of image in a video of a first category is determined as a cover image for the first category;
  sending the plurality of cover images to a user equipment, wherein the plurality of cover images are displayed synchronously with a first video being played and are displayed at least partially superimposed on the first video being played;

selecting a first image from the plurality of cover images in respond to a first user input;

automatically selecting a second video from a first category corresponding to the first image;

acquiring the second video; and sending at least a part of the second video to the user equipment to play the second video, wherein the plurality of cover images are displayed synchronously with the second video being played and are displayed at least partially superimposed on the second video being played.

8. The method of claim 7, further comprising:

receiving a second user input indicating to select a second image from the plurality of cover images, wherein the second image is different from the first image and corresponds to a second category, and the plurality of cover images are at least partially superimposedly displayed on the second video being played;

automatically selecting a third video from the second category corresponding to the second image;

acquiring the third video; and sending at least a part of the third video to the user equipment, wherein the user equipment plays the third video, wherein the plurality of cover images are at least partially superimposedly displayed on the third video being played.

9. The method of claim 7, wherein at least a part of the plurality of videos includes a pre-recorded audio overlay.

10. The method of claim 7, wherein before responding to the first user input, the method further comprises:

receiving the first user input from a remote control device associated with the user equipment.

11. The method of claim 10, wherein the user equipment includes a smart TV.

12. The method of claim 7, wherein at least a part of the plurality of videos includes short videos.

13. A non-transitory computer-readable storage medium on which a computer program is stored, the computer program causing a processor to perform a video distribution method, the method comprising:

classifying a plurality of videos into a plurality of categories based on attributes associated with the plurality of videos;

determining a plurality of cover images for the plurality of categories respectively, wherein one frame of image in a video of a first category is determined as a cover image for the first category;

sending the plurality of cover images to a user equipment, wherein the plurality of cover images are displayed synchronously with a first video being played and are displayed at least partially superimposed on the first video being played;

selecting a first image from the plurality of cover images in respond to a first user input;

automatically selecting a second video from a first category corresponding to the first image;

acquiring the second video; and sending at least a part of the second video to the user equipment to play the second video, wherein the plurality of cover images are displayed synchronously with the second video being played and are displayed at least partially superimposed on the second video being played.

14. The non-transitory computer-readable storage medium of claim 13, the method further comprising:

receiving a second user input indicating to select a second image from the plurality of cover images, wherein the second image is different from the first image and corresponds to a second category, and the plurality of cover images are at least partially superimposedly displayed on the second video being played;

automatically selecting a third video from the second category corresponding to the second image;

acquiring the third video; and sending at least a part of the third video to the user equipment, wherein the user equipment plays the third video, wherein the plurality of cover images are at least partially superimposedly displayed on the third video being played.

15. The non-transitory computer-readable storage medium of claim 13, wherein at least a part of the plurality of videos includes a pre-recorded audio overlay.

16. The non-transitory computer-readable storage medium of claim 13, wherein before responding to the first user input, the method further comprises:

receiving the first user input from a remote control device associated with the user equipment.

17. The non-transitory computer-readable storage medium of claim 16, wherein the user equipment includes a smart TV.

18. The non-transitory computer-readable storage medium of claim 13, wherein at least a part of the plurality of videos includes short videos.

* * * * *